United States Patent
Chung

(10) Patent No.: US 9,514,425 B2
(45) Date of Patent: Dec. 6, 2016

(54) METHOD AND SYSTEM FOR PROVIDING USER-CUSTOMIZED CONTENTS

(75) Inventor: Hee Sung Chung, Seoul (KR)

(73) Assignee: Neopad Inc., Seoul (KR)

(*) Notice: Subject to any disclaimer, the term of this patent is extended or adjusted under 35 U.S.C. 154(b) by 0 days.

(21) Appl. No.: 13/387,114

(22) PCT Filed: Dec. 22, 2011

(86) PCT No.: PCT/KR2011/009972
§ 371 (c)(1),
(2), (4) Date: Jan. 25, 2012

(87) PCT Pub. No.: WO2012/091360
PCT Pub. Date: Jul. 5, 2012

(65) Prior Publication Data
US 2012/0271812 A1    Oct. 25, 2012

(30) Foreign Application Priority Data
Dec. 28, 2010 (KR) .................. 10-2010-0136933

(51) Int. Cl.
*G06F 17/30* (2006.01)
*G06Q 10/06* (2012.01)
*G06Q 50/00* (2012.01)

(52) U.S. Cl.
CPC ............ *G06Q 10/06* (2013.01); *G06Q 50/01* (2013.01)

(58) Field of Classification Search
CPC ............... G06F 17/3089; G06F 17/30011
USPC ....... 707/709, 737, 714, 794, 711; 715/751, 715/507, 226, 760, 708; 705/1, 2, 39, 14
See application file for complete search history.

(56) References Cited

U.S. PATENT DOCUMENTS

| | | | | |
|---|---|---|---|---|
| 5,701,453 A | * | 12/1997 | Maloney et al. | 707/714 |
| 5,835,923 A | * | 11/1998 | Shibata et al. | 715/246 |
| 7,051,273 B1 | * | 5/2006 | Holt et al. | 715/226 |
| 7,822,626 B2 | * | 10/2010 | Harp et al. | 705/2 |
| 7,930,302 B2 | * | 4/2011 | Bandaru et al. | 707/737 |
| 8,200,700 B2 | * | 6/2012 | Moore et al. | 707/791 |
| 8,275,796 B2 | * | 9/2012 | Spivack et al. | 707/794 |
| 2003/0055669 A1 | * | 3/2003 | Ryan et al. | 705/1 |
| 2003/0069877 A1 | * | 4/2003 | Grefenstette et al. | 707/2 |

(Continued)

FOREIGN PATENT DOCUMENTS

| | | |
|---|---|---|
| CN | 101569158 A | 10/2009 |
| JP | 2002-259584 A | 9/2002 |

(Continued)

OTHER PUBLICATIONS

English Language Abstract of KR 10-2000-0064081 A.

(Continued)

*Primary Examiner* — Mariela Reyes
*Assistant Examiner* — Thong Vu
(74) *Attorney, Agent, or Firm* — Westerman, Hattori, Daniels & Adrian, LLP

(57) ABSTRACT

A method for providing user-customized contents, includes: receiving contents order information from a user and constructing a contents order information DB; opening the contents order information DB; receiving contents corresponding to the contents order information from a contents provider; and providing the received contents in a user-customized form.

62 Claims, 25 Drawing Sheets

(56) References Cited

U.S. PATENT DOCUMENTS

| | | | |
|---|---|---|---|
| 2003/0217328 A1* | 11/2003 | Agassi et al. | 715/500 |
| 2004/0162856 A1* | 8/2004 | Saari | G06F 17/30867 |
| 2006/0173838 A1* | 8/2006 | Garg et al. | 707/5 |
| 2006/0253773 A1* | 11/2006 | Hsieh | 715/507 |
| 2007/0016563 A1* | 1/2007 | Omoigui | 707/3 |
| 2008/0306959 A1* | 12/2008 | Spivack et al. | 707/9 |
| 2009/0063983 A1* | 3/2009 | Amidon et al. | 715/733 |
| 2010/0004944 A1* | 1/2010 | Palaniappan | 705/1 |
| 2010/0100549 A1* | 4/2010 | Ishida | 707/741 |
| 2010/0100827 A1* | 4/2010 | Hawthorne et al. | 715/751 |
| 2010/0185664 A1* | 7/2010 | Baggott et al. | 707/769 |
| 2010/0251156 A1* | 9/2010 | Cantwell | 715/771 |
| 2011/0093469 A1* | 4/2011 | B'Far et al. | 707/741 |
| 2011/0145279 A1* | 6/2011 | Chunilal | 707/769 |
| 2011/0196855 A1* | 8/2011 | Wable | G06F 17/30631 707/711 |
| 2011/0264649 A1* | 10/2011 | Hsiao et al. | 707/722 |
| 2012/0102050 A1* | 4/2012 | Button et al. | 707/749 |

FOREIGN PATENT DOCUMENTS

| | | |
|---|---|---|
| JP | 2009-211161 A | 9/2009 |
| JP | 2010-224753 A | 10/2010 |
| KR | 10-2000-0064081 A | 11/2000 |
| KR | 2000-0064081 A | 11/2000 |
| KR | 10-2009-0001578 A | 1/2009 |
| KR | 10-2009-0002531 A | 1/2009 |
| KR | 2009-0001578 A | 1/2009 |
| KR | 2009-0002531 A | 1/2009 |
| KR | 10-2009-0072575 A | 7/2009 |
| KR | 2009 072575 A | 7/2009 |
| WO | WO 2008086638 A1 * | 7/2008 |

OTHER PUBLICATIONS

English Language Abstract of KR 10-2009-0002531 A.
English Language Abstract of KR 10-2009-0072575 A.
International Search Report of PCT/KR2011/009972 mailed on Jul. 18, 2012.
Chinese Office Action for corresponding Application No. 2015012301087490 issued Jan. 28, 2015.
Japanese Office Action dated Nov. 17, 2015 issued in counterpart Japanese Patent Application No. 2013-547314 (4 pages).
Extended European Search report dated May 6, 2016 issued in counterpart EP Patent Application No. 11853136.7 (4 pages).
Office Action dated Aug. 9, 2016, issued in counterpart Japanese Patent Application No. 2013-547314, with English translation. (8 pages).

* cited by examiner

| USER ID | METADATA ELEMENT NAME | ONTOLOGY STRUCTURE VALUE | METADATA ELEMENT NAME | ONTOLOGY STRUCTURE VALUE | ... | POSTING PLACE | ... | POSTING FORM | ... |
|---|---|---|---|---|---|---|---|---|---|
| KIMXX 111 | PARKXX | 1111x1 | AGED | 11311 | ... | 138.286.723.345 IP address | ... | 101 | ... |
| LEEOO 123 | PARKXX | 1111x1 | AGED | 11311 | ... | Phone number | ... | 102 | ... |
| ... | ... | ... | ... | ... | ... | ... | ... | ... | ... |

| USER ID | METADATA ELEMENT NAME | POSITION DESIGNATION | METADATA ELEMENT NAME | PAST ONE -WEAK POSITION | METADATA ELEMENT NAME | ONTOLOGY STRUCTURE VALUE 24 | HOSPITAL INFORMATION CONTENTS | METADATA ELEMENT NAME | POSTING PLACE | POSTING FORM |
|---|---|---|---|---|---|---|---|---|---|---|
| LEEXX 12 | POSITION INFORMATION | YEOKSAM STATION | 22131 | GANGNAM STATION | HOSPITAL INFORMATION | ... | Yes | ... | ... | ... |
| PARKOO 34 | POSITION INFORMATION | JAMSIL STATION | ... | JAMSIL STATION | ... | ... | ... | ... | ... | ... |
| ... | ... | ... | ... | | ... | ... | ... | ... | ... | ... |

FIG. 7

| USER ID | METADATA ELEMENT NAME | ONTOLOGY STRUCTURE VALUE | METADATA ELEMENT NAME | ONTOLOGY STRUCTURE VALUE | POSTING PLACE | POSTING DATE | POSTING FORM | ... |
|---|---|---|---|---|---|---|---|---|
| KIMXX | SUSHI | 3731 | MARRIED | 361 | ... | ... | ... | ... |
| ... | ... | ... | ... | ... | ... | ... | ... | ... |

```
< rdf : RDF >
   Xmlns : rdf = "http://www.w3.org/1999/02/22-rdf-syntax-ns#"
   Xmlns : outo = "http://naviya.com/outo/">
   < rdf : Description >
   < outo : userid > KimXX < outo : userid >
   < outo : metaelle > ParkXX < outo : metaelle >
   < outo : outoval > 1111X1 < outo : outoval >
   < outo : displa > 113.286.723.325 < outo : displa >
   < outo : disfig > 101 < outo : disfig >
< /rdf : Discription >
< rdf : Discription >
       < outo : userid > LeeOO < outo : userid >
       < outo : metaelle > ParkXX < outo : metaelle >

...

< /rdf : Discription >
< rdf : RDF >
```

FIG. 13

| PRECEDENCE | METADATA ELEMENT NAME | ORDER NUMBER | ONTOLOGY STRUCTURE VALUE | ... | ... |
|---|---|---|---|---|---|
| 1 | PARK XX | 170,000 | 1111X1 | ... | ... |
| 2 | WELFARE POLICY | 150,000 | 1113 | ... | ... |
| ... | ... | ... | ... | ... | ... |

| PRECEDENCE | METADATA ELEMENT NAME | ORDER NUMBER | POSITION DESIGNATION | ONTOLOGY STRUCTURE VALUE | ... |
|---|---|---|---|---|---|
| 1 | YEOKSAM STATION | 150,000 | MAP INFORMATION | 22131 | ... |
| 2 | GANGNAM STATION | 140,000 | MAP INFORMATION | 23111 | ... |
| ... | ... | ... | ... | ... | ... |

FIG. 15b

| PRECEDENCE | METADATA ELEMENT NAME | ORDER NUMBER | ONTOLOGY STRUCTURE VALUE | ... | ... |
|---|---|---|---|---|---|
| 1 | WINE | 140,000 | 375 | ... | ... |
| 2 | SUSHI | 120,000 | 3731 | ... | ... |
| ... | ... | ... | ... | ... | ... |

FIG. 15c

| Naviya | | | |
|---|---|---|---|
| INTERGEST AREA CONTENTS | | | POSITION INFORMATION CONTENTS |
| POLITICS | | | AROUND GANGNAM STATION |
| KIM XX | | | 1. FAMOUS RESTAURANTS |
| WELFARE POLICY OF DEMOCRATIC PARTY | PERSONAL INFORMATION CONTENTS | ACTIVITY CONTENTS | 2. CAFES, BARS |
| ... | FAVORITE FOOD | SHOPPING INFORMATION | 3. DATING PLACE |
| ECONOMICS | 1. JAPANESE FOOD | 1. BRAND-NAME PRODUCT | 4. HOSPITAL (PEDIATRICS) |
| 1. STOCK INFORMATION | 2. WINE | 2. SHOES | 5. ... |
| 2. EXCHANGE RATE | 3. ... | 3. BOOKS | 6. ... |
| 3. ... | ADDRESS INFORMATION | WEDDING SCHEDULE | 7. ... |
| ENTERTAINMENT | 1. LOCAL EVENTS | 1. FIND WEDDING PLACE | 8. ... |
| 1. K-POP RANKING | 2. ... | 2. WEDDING DRESS | 9. ... |
| 2. AMERICAN DRAMA | 3. ... | 3. WEDDING PRESENT | 10. ... |
| 3. ... | 4. ... | 4. ... | 11. ... |
| 4. ... | | | 12. ... |

FIG. 24

METHOD AND SYSTEM FOR PROVIDING USER-CUSTOMIZED CONTENTS

CROSS REFERENCE TO RELATED APPLICATIONS

This application is a National Stage application of International Application No. PCT/KR2011/009972, filed Dec. 22, 2011, claiming priority from Korean Patent Application No. 10-2010-0136933, filed Dec. 28, 2010, the contents of all of which are incorporated herein by reference in their entirety.

TECHNICAL FIELD

The present invention relates to a method and system for providing user-customized contents, in which a contents provider or contents providing agency provides user-customized contents by referring to order information of a user when the user inputs the information on desired contents in person.

BACKGROUND

With the development of the Internet, users obtain a variety of information from various information communication equipments anywhere and anytime. For example, users often read various types of information using various information communication equipments such as smart phone, smart pad, notebook, and desktop PC.

Recently, data storage media have been increased in capacity and reduced in price, and Internet connection techniques have been diversified and increased in speed. Accordingly, users encounter an enormous quantity of contents. Furthermore, general users as well as large contents providers provide various contents based on fundamental techniques such as Blog, SNS (Social Networking Service), Twitter, and Internet Cafes. That is, as anyone may provide information and contents anywhere and anytime, contents are gradually becoming huge.

Therefore, precision and recall of information retrieval have become further important. For example, techniques such as Semantic Web are used for retrieving information and generating new contents. Semantic Web enables a computer to read, understand, and process information instead of a person.

Yet, the information retrieval (or contents retrieval) has been centered around contents providers. That is because, when a user inputs a search word into a search window of a portal site or the like, current information retrieval systems filter and extract information based on the user's search word.

In such information retrieval systems, users should repeat a retrieval operation several times, in order to acquire contents containing information desired by the users. Sometimes, although users spare a large amount of time for contents retrieval, the users may not acquire desired contents, but should pay for using the Internet. This is because, although the users want to read specific and professional contents, information retrieval systems do not actively deal with users' requests.

DISCLOSURE

Technical Problem

An embodiment of the present invention is directed to a method and system for providing user-customized contents, which provides contents corresponding to order information of a user through a designated terminal, by a designated volume, and at a designated time when the user order contents in a metadata form, unlike a conventional method in which a user retrieves contents using a search engine.

Technical Solution

In accordance with an embodiment of the present invention, a method for providing user-customized contents, includes: receiving contents order information from a user and constructing a contents order information DB; opening the contents order information DB; receiving contents corresponding to the contents order information from a contents provider; and providing the received contents in a user-customized form.

The contents may include any one of homepage contents of a web site, blog contents, SNS (social networking service) contents, advertisement contents, web service contents, music contents, video contents, still image contents, e-book contents, and text contents.

The contents order information DB may store metadata elements corresponding to the user's contents order information as attributes.

The metadata elements may be generated by an ontology which is an order information expression frame.

The ontology may have a tree structure, and a word may be allocated to each node of the tree structure and have an ontology structure value.

The ontology structure value may include a numerical value.

The ontology may be provided for each of interest area information, position information, personal information, activity record information, and activity schedule information of the user.

The contents order information DB may include one or more of: an interest area information DB configured to store the interest area information of the user; a position information DB configured to store the position information of the user; a personal information DB configured to store the personal information of the user; and an activity record/ activity schedule information DB configured to store the activity record/activity schedule information of the user.

The interest area information DB may have an attribute including one or more metadata elements of politics, society, economics, culture, science technology, entertainment, international affairs, education, health, childcare, weather, regions, jobs, labor, and welfare.

The position information DB may have an attribute including metadata elements of current position information of the user.

The personal information DB may have an attribute including one or more metadata elements of a name, family relations, a work place, a telephone number, an anniversary, a birthday, a hobby, and preference.

The activity record/schedule information DB may have an attribute including one or more metadata elements of shopping records, travel records, and purchase information, which are related to the activity record information of the user, and one or more metadata elements of purchase schedule, travel schedule, marriage schedule, and event schedule, which are related to the activity schedule information of the user.

The interest area information DB, the position information dB, the personal information DB, and the activity record/activity schedule DB may further include an attribute for a contents posting method.

The contents posting method may include one or more metadata elements of a contents posting place, a contents size, a posting form, a production date, and a posting date.

The constructing of the contents order information DB may include: providing a metadata element related to the contents order information to a user terminal; and storing a metadata element selected or written by the user as an attribute of the contents order information DB.

The constructing of the contents order information DB may include: inputting, by the user, contents order information to a user terminal; extracting an ontology structure value coinciding with a metadata element name of the inputted contents order information; and implementing the contents order information DB using the metadata element name and the ontology structure value as attributes.

The contents order information DB may be implemented by a DB using one or more markup languages among an RDB (relation data base) model, XML, XHTML, and HTML.

The opening of the contents order information DB may include: acquiring statistics for orders of the user for each metadata element name of the contents order information DB; deciding precedence of each metadata element name based on the statistics for orders of the user; and opening the contents order information DB according to the precedence of each metadata element name.

The statistics for orders of the user for each metadata element name and the precedence of each metadata element name may be stored in and managed by a contents order statistics DB.

The contents order statistics DB may include attribute data of the precedence of each metadata element, a metadata element name, an order number, and an ontology structure value.

The contents order statistics DB may be implemented by a DB using one or more markup languages of an RDB model, XML, XHTML, and HTML.

The method may further include constructing a contents provision information DB by receiving contents provision information from a contents provider.

The contents provision information DB may store a metadata element corresponding to the contents order information of the user as an attribute.

The metadata element may be generated by an ontology which is a provision information expression frame.

The ontology may have a tree structure, and a word may be allocated to each node of the tree structure and have an ontology structure value.

The ontology structure value may include a numerical value.

The ontology may be provided for each of interest area information, position information, personal information, activity record information, and activity schedule information of the user.

The constructing of the contents provision information DB may include: confirming whether the contents provider is an effective contents provider or not; selecting an area of contents to be provided; creating metadata elements for the contents to be provided; and implementing the contents provision information DB using the metadata elements for the contents to be provided.

The constructing of the contents provision information DB may include: inputting a metadata element name for contents provided by the contents provider; retrieving the ontology using the inputted metadata element name; extracting an ontology structure value; and implementing the contents provision information DB using the inputted metadata element name and the ontology structure value as attributes.

The constructing of the contents provision information DB may include: operating a text crawler to scan texts within contents; extracting a keyword from the texts; retrieving the ontology of the contents order information using the keyword; extracting an ontology structure value; and implementing the contents provision information DB using the keyword and the ontology structure value as attributes.

The constructing of the contents provision information DB may include: operating a text crawler to scan texts within contents; generating a keyword by morpheme-processing the texts; retrieving the ontology of the contents order information using the keyword; extracting an ontology structure value; and implementing the contents provision information DB using the keyword and the ontology structure value as attributes.

The contents provision information DB may have an attribute including one or more of a keyword, a contents name, a producer, a production date, a provision site, a place, content, a character, and an ontology structure value.

The contents provision information DB may be implemented by a DB using one or more markup languages of an RDB model, XML, XHTML, and HTML.

The method may further include filtering contents provided after the receiving of the contents corresponding to the contents order information.

The filtering of the provided contents may include: extracting an order information keyword of the user; comparing the extracted keyword with a provision information keyword of the contents provider; calculating a keyword coincidence; and linking the provided contents according to the keyword coincidence.

The method may further include constructing a contents posting information DB by storing contents posting information according to the keyword coincidence.

The method may further include waiting for posting of contents according to a contents posting method designated by the user.

The method may further include constructing a user contents posting information DB configured to store contents posting information for each user according to the contents posting method designated by the user.

The calculating of the keyword coincidence may include: comparing character strings of the keyword extracted from the order information of the user and the keyword provided from the contents provider; comparing ontology structure values of the two keywords when the character strings coincide with each other; and calculating a coincidence according to the comparison result of the ontology structure values.

The coincidence may be expressed as percentage.

The providing of the contents in the user-customized form may include: extracting a contents posting method designated by the user from the contents order information DB; constructing a user contents posting information DB to store contents posting information for each user; and providing ordered contents to a user terminal by referring to the user contents posting information DB.

The user contents posting information DB may include one or more attributes of a user ID, an order field, a metadata element name, a posting date, a posting form, a posting place, and order contents link data.

The user contents posting information DB may be implemented by a DB using one or more markup languages of an RDB model, XML, XHTML, and HTML.

In accordance with another embodiment of the present invention, a system for providing user-customized contents includes: a user terminal; a user-customized contents providing server connected to the user terminal through a wired or wireless network; a contents order information DB configured to store contents order information of a user; a contents provision information DB configured to store contents provision information of a contents provider; and a user-customized contents posting provider configured to provide contents provided from the contents provider in a user-customized form by referring to the contents order information DB and the contents provision information DB.

The contents may include any one of homepage contents of a web site, blog contents, SNS contents, advertisement contents, web service contents, music contents, video contents, still image contents, e-book contents, and text contents.

The system may further include: a contents order metadata generator configured to generate metadata for the contents order information of the user; and a contents order information DB generator configured to generate the contents order information DB using a metadata element corresponding to the contents order information of the user as an attribute.

The metadata element may be generated by an ontology which is an order information expression frame.

The ontology may have a tree structure, and a word may be allocated to each node of the tree structure and have an ontology structure value.

The ontology structure value may include a numeral value.

The ontology may be provided for each of interest area information, position information, personal information, activity record information, and activity schedule information of the user.

The contents order information DB may include one or more of: an interest area information DB configured to store the interest area information of the user; a position information DB configured to store the position information of the user; a personal information DB configured to store the personal information of the user; and an activity record/activity schedule information DB configured to store the activity record/activity schedule information of the user.

The interest area information DB has an attribute comprising one or more metadata elements of politics, society, economics, culture, science technology, entertainment, international affairs, education, health, childcare, weather, regions, jobs, labor, and welfare.

The position information DB may have an attribute including metadata elements of current position information of the user.

The personal information DB may have an attribute including one or more metadata elements of a name, family relations, a work place, a telephone number, an anniversary, a birthday, a hobby, and preference.

The activity record/schedule information DB may have an attribute including one or more metadata elements of shopping records, travel records, and purchase information, which are related to the activity record information, and one or more metadata elements of purchase schedule, travel schedule, marriage schedule, and event schedule, which are related to the activity schedule information of the user.

The interest area information DB, the position information DB, the personal information DB, and the activity record/activity schedule DB may further include an attribute for a contents posting method.

The contents posting method may include one or more metadata elements of a contents posting place, a contents size, a posting form, a production date, and a posting date.

The contents order information DB may provide a metadata element related to the contents order information to the user terminal, and store the contents order information using a metadata element selected or written by the user as an attribute.

The contents order information DB may store the contents order information using a metadata element name of the contents order information inputted by the user and an ontology structure value coinciding with the metadata element name as attributes.

The contents order information DB may be implemented by a DB using any one markup languages of an RDB model, XML, XHTML, and HTML.

The system may further include a contents order information opener configured to open the contents order information of the user.

The system may further include a contents order statistics DB configured to store statistics for orders of the user and precedence for each metadata element name of the contents order information DB.

The contents order statistics DB may include attribute data of the precedence of each metadata element, a metadata element name, an order number, and an ontology structure value.

The contents order statistics DB may be implemented by a DB using any one markup languages of an RDB model, XML, XHTML, and HTML.

The system may further include: a contents provision metadata generator configured to generate metadata for the contents provision information of the contents provider; and a contents provision information DB generator configured to generate the contents provision information DB using a metadata element corresponding to the contents provision information of the contents provider as an attribute.

The contents provision information DB may store the contents provision information using a metadata element corresponding to the order information of the user as an attribute.

The metadata element may be generated by an ontology which is a provision information expression frame.

The ontology may have a tree structure, and a word may be allocated to each node of the tree structure and have an ontology structure value.

The ontology structure value may include a numeral value.

The ontology may be provided for each of interest area information, position information, personal information, activity record information, and activity schedule information of the user.

The system may further include a text crawler configured to scan texts from the contents provided by the content provider.

The system may further include a morpheme processor configured to morpheme-process the texts scanned by the text crawler and extract a keyword.

The contents provision information DB may have an attribute including one or more of a keyword, a contents name, a producer, a production date, a provision site, a place, content, a character, and an ontology structure value.

The contents provision information DB may be implemented by a DB using one or more markup languages of an RDB mode, XML, XHTML, and HTML.

The system may further include a contents filtering processor configured to filter contents customized to the order information of the user by referring to the contents order information DB and the contents provision information DB.

The contents filtering processor may calculate a coincidence between an order information keyword of the user and a provision information keyword of the contents provider, and filters contents based on the coincidence.

The system may further include a contents posting information DB configured to store contents posting information according to the keyword coincidence.

The system may further include a user contents posting information DB configured to store contents posting information for each user according to a contents posting method designated by the user.

The contents filtering processor may compare character strings of the keyword extracted from the order information of the user and the keyword provided from the contents provider, and calculate a coincidence by comparing ontology structure values of the two keywords when the character strings coincide with each other.

The coincidence may be expressed as percentage.

The user contents posting information DB may include one or more attributes of a user ID, an order field, a metadata element name, a posting date, a posting form, a posting place, and order contents link data.

The user contents posting information DB may be implemented by a DB using one or more markup languages of an RDB model, XML, XHTML, and HTML.

Advantageous Effects

According to the method and system for providing user-customized contents, when a user selects or writes contents order information without performing a plurality of search operations to find desired contents, the user may received the contents in a desired form, by a desired volume, through a desired terminal, and at a desired time, which makes it possible to create a new information distribution market.

Furthermore, users may quickly receive desired contents at a low cost, and contents providers produces contents customized to users' preferences. Therefore, it is possible to prevent an opportunity loss caused by producing unnecessary contents and to specialize and specify contents.

Furthermore, contents provided by contents providers may be provided in a catalogue form customized to a user's order, which makes it possible to create a new market called a contents catalogue service.

Furthermore, contents customized to users' requests may be collected and filtered, which makes it possible to activate the market of the contents agent technology field.

BRIEF DESCRIPTION OF THE DRAWINGS

FIG. 7 shows a data table of a metadata DB for the position information.

FIG. 13 shows an example in which metadata elements for ordering contents are expressed by XML.

FIG. 14 is a flow chart showing an example of opening the contents order information DB.

FIGS. 15A to 15C show data tables of a contents order statistics DB.

FIG. 24 shows an example in which a user receives a posting form of contents ordered by the user on a desktop PC.

BEST MODE FOR THE INVENTION

Figure 1:
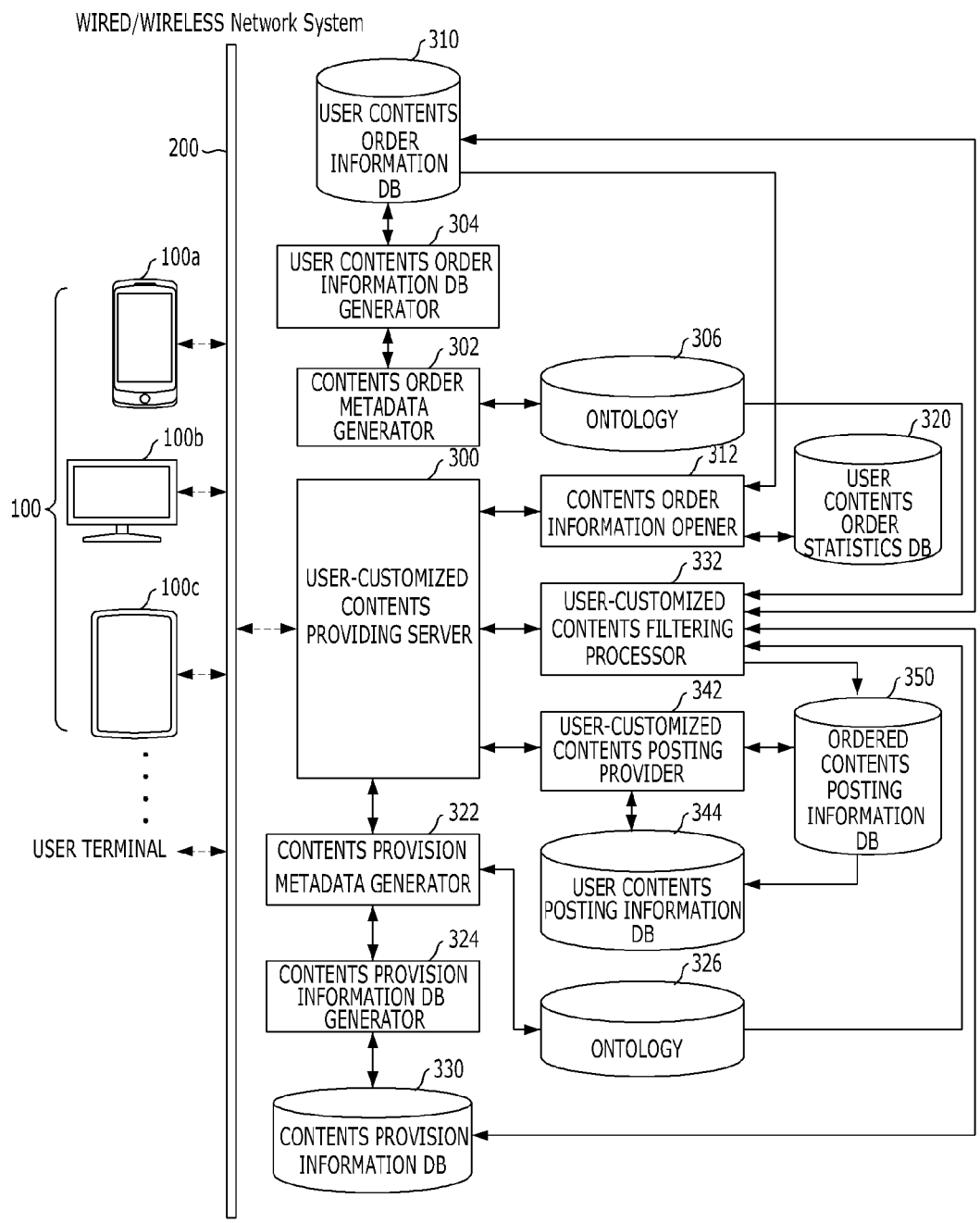
FIG. 1 is a block diagram of a system for providing user-customized contents according to an embodiment of the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a block diagram of a system for providing user-customized contents according to an embodiment of the present invention. Referring to FIG. 1, a user side includes a user terminal 100 such as a smart phone 100*a*, a desktop PC 100*b*, a smart pad 100*c*, a notebook, or IPTV (Internet Protocol TV).

The user terminal 100 is connected to a user-customized contents providing server 300 through a wired or wireless network 200. The user-customized contents providing server 300 includes a contents provider's server or a contents providing agency's server. The system for providing user-customized contents according to the embodiment of the present invention has such a system configuration as illustrated in FIG. 1.

The system according to the embodiment of the present invention includes a system for constructing a contents order information DB from the user terminal 100, a system for opening the contents order information DB, a contents providing system, a contents filtering system, and a system for providing contents in a user-customized form.

The contents order information DB construction system includes a contents order metadata generator 302 for contents order, a contents order information DB generator 304, an ontology 306, and a contents order information DB 310. The contents order information DB generator 304 is configured to generate a contents order information DB when a user selects and creates metadata. The ontology 306 is configured to generate a metadata element name. The contents order information DB 310 is configured to store and manage contents order information of the user.

The contents order information DB opening system includes a contents order information opener 312 and a contents order statistic DB 320. The contents order information opener 312 is configured to open contents order information, and the contents order statistics DB 320 is configured to convert statistics for the contents order information of the user into data.

The contents providing system includes a contents provision metadata generator 322 for contents provision, a contents provision information DB generator 324, an ontology 326, and a contents provision information DB 330. The contents provision information DB generator 324 is configured to generate a contents provision information DB when a contents provider selects or creates metadata. The ontology 326 is configured to generate a metadata element name. The contents provision information DB 330 is configured to store and manage provision information of the contents provider.

The contents filtering system includes a contents filtering processor 332 configured to filter the contents provision information into user-customized information by referring to the user's contents order information and update the contents provision information DB 330.

The user-customized contents providing system includes a user-customized contents posting provider 342, a contents posting information DB 350, and a user contents posting information DB 344. The user-customized contents posting provider 342 is configured to provide the filtered contents to the user terminal 100. The contents posting information DB 350 is configured to store and manage posing information of ordered contents. The user contents posing information DB 344 is configured to store and manage contents posting information for each user.

Hereinafter, the functions and processes of the respective systems and the components thereof will be described in detail.

Here, 'contents order information' refers to contents information for ordering contents desired by a user. The contents order information may be provided to a contents provider or contents providing agency such that a user receives desired contents. Therefore, a process of constructing a DB for storing users' contents order information is previously performed.

In this embodiment of the present invention, metadata indicating data for data or attribute information of data is used to construct the contents order information DB. In FIG. 1, the contents order metadata generator 302 expresses information on contents ordered by a user as metadata elements and posts the metadata elements on the user's terminal. Therefore, the user may select metadata elements posted on the user's terminal or create metadata elements, and then transmit the contents order information.

The respective elements of the metadata are provided in such a form that is easy for users to understand, that is, in a table or list form. The user writes values into the respective elements of the metadata on the user terminal 100 or selects metadata elements according to a menu selection method, and then transmits the contents order information to the user-customized contents providing server 300.

The contents order information DB generator 304 is configured to construct the contents order information DB using the values written into the metadata elements or the metadata elements selected by the user. The metadata elements are provided for each of contents based on interest area information of the user, contents based on position information of the user, contents based on personal information of the user, and contents on activity record/activity schedule information of the user.

Accordingly, the contents order information DB 310 includes an interest area information DB 310a, a position information DB 310b, a personal information DB 310c, an activity record/activity schedule information DB 310d. The activity record/activity schedule information DB 310d may be divided into individual DBs. However, since the individual DBs contain overlapping information, the DBs will be represented by the single DB in the following descriptions. Furthermore, the contents order information DB 310 may includes a combination of the independent DBs or may be constructed as an integrated DB on the user-customized contents providing server.

The integrated DB refers to a DB system including a plurality of DBs distributed in a single server system, and the independent DBs refer to DB systems which are distributed to a plurality of server systems, respectively. When the number of users becomes huge, the distributed DB systems, for example, a so-called cloud computing environment may be adopted.

The ontology 306 is an order information expression frame for ordering user-customized contents and is configured to generate metadata elements.

'Ontology' is a general technical term used for artificial intelligence research which is a branch of computer science and contains various meanings. In this embodiment, however, the ontology is used as an expression method for expressing order information of users, that is, a lexical system defining relations between metadata elements, in order to provide user-customized contents. An order form for contents desired by users is required to order user-customized contents. Therefore, in this embodiment of the present invention, metadata are used for the order information form, and the ontology is used for generating the metadata elements.

The contents order informer opener 312 is configured to acquire statistics for order information of users and store the statistics in the contents order statistics DB 320. The data stored in and managed by the contents order statistics DB 320 are opened to contents providers.

The contents provision metadata generator 322 is configured to express information on contents provided by contents providers as metadata elements. The ontology 326 as a contents provision information expression frame is used to generate metadata elements. Furthermore, the contents provision information DB generator 324 is configured to construct a contents provision information DB 330 based on the metadata elements. The contents provision metadata generator 322 and the contents provision information DB generator 324 are used for contents providers.

The contents provision information DB 330 is a DB opened to contents providers, and is configured to store and manage contents information provided by contents providers. The contents provision information DB 330 is referred to when user-customized contents are provided to a user.

The contents filtering processor 322 is configured to determine a coincidence between contents order information of a user and contents provision information of a contents provider and link relevant order contents. The contents filtering processor 332 determines the coincidence by referring to the contents order information DB 310 and the ontology 306 and the contents provision information DB 330 and the ontology 326, respectively, and the filtered data are stored in and managed by the contents posting information DB 350.

The user-customized contents posting provider 342 is configured to arrange and link user-customized contents which are matched and filtered according to contents order information of a user and post and provide the contents in consideration of a terminal, a time zone, a posting form and a volume desired by the user.

The user contents posting information DB 344 is configured to store and manage data including contents, which are to be provided to each user ordering contents, and a contents posting condition.

Figure 2:
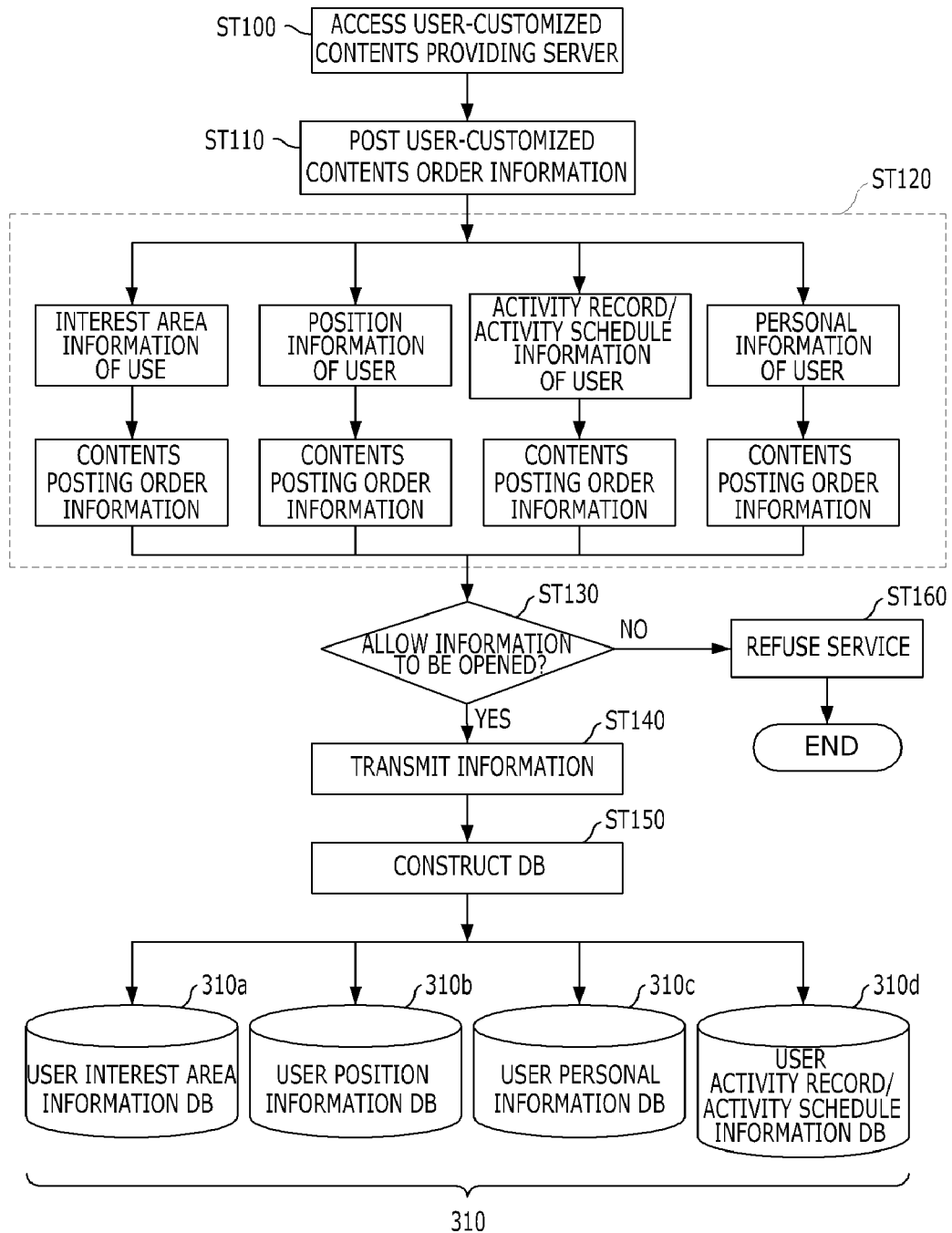
FIG. 2 shows a process of constructing a contents order information DB.

FIG. 2 shows a process of constructing the contents order information DB.

As a user accesses the user-customized contents providing server 300 through the user terminal 100, the process is started at step ST100. For example, the user may express his/her intention to register order information by clicking a user-customized contents information registration icon on a web page provided by the user-customized contents providing server 300.

The contents order metadata generator 302 informs the user of order information posting, and posts an icon to request order information provision including a plurality of areas, on the user terminal 100 at step ST110. The information order areas include interest area information, position information, personal information, and activity record/activity schedule information. The information order areas are posted as separate icons on the user terminal 100.

For example, the user may select an icon among an interest area icon, a position information icon, a personal information icon, and an activity record/activity schedule information icon. For another example, when the entire order information of the four areas needs to be provided, the information providing procedures of the respective areas may be sequentially performed.

This will be described below with reference to FIG. 3.

After the user completes the information providing procedure for any one or all of the order information of the four areas, a contents posing order information procedure for inputting a contents posting method, a size, a form, a place and so on is performed at step ST120. The place may include the type or IP address of a user terminal.

Then, whether the user allows the information to be opened or not is confirmed at step ST130. When the users allows the information to be opened, the order information written or selected by the user is transmitted to the user-customized contents providing server 300 at step ST140, and the user-customized contents providing server 300 constructs the contents order information DB 310.

On the other hand, when the user does not allow the information to be opened, it is determined at step ST160 that the user refuses the user-customized contents provision service, and the process is ended.

FIGS. 3A to 3D illustrate processes of posting contents order information as metadata elements. Icons illustrated in the upper side of each drawing sequentially represent the interest area information, the position information, the personal information, and the activity record/activity schedule information.

Figure 3A:
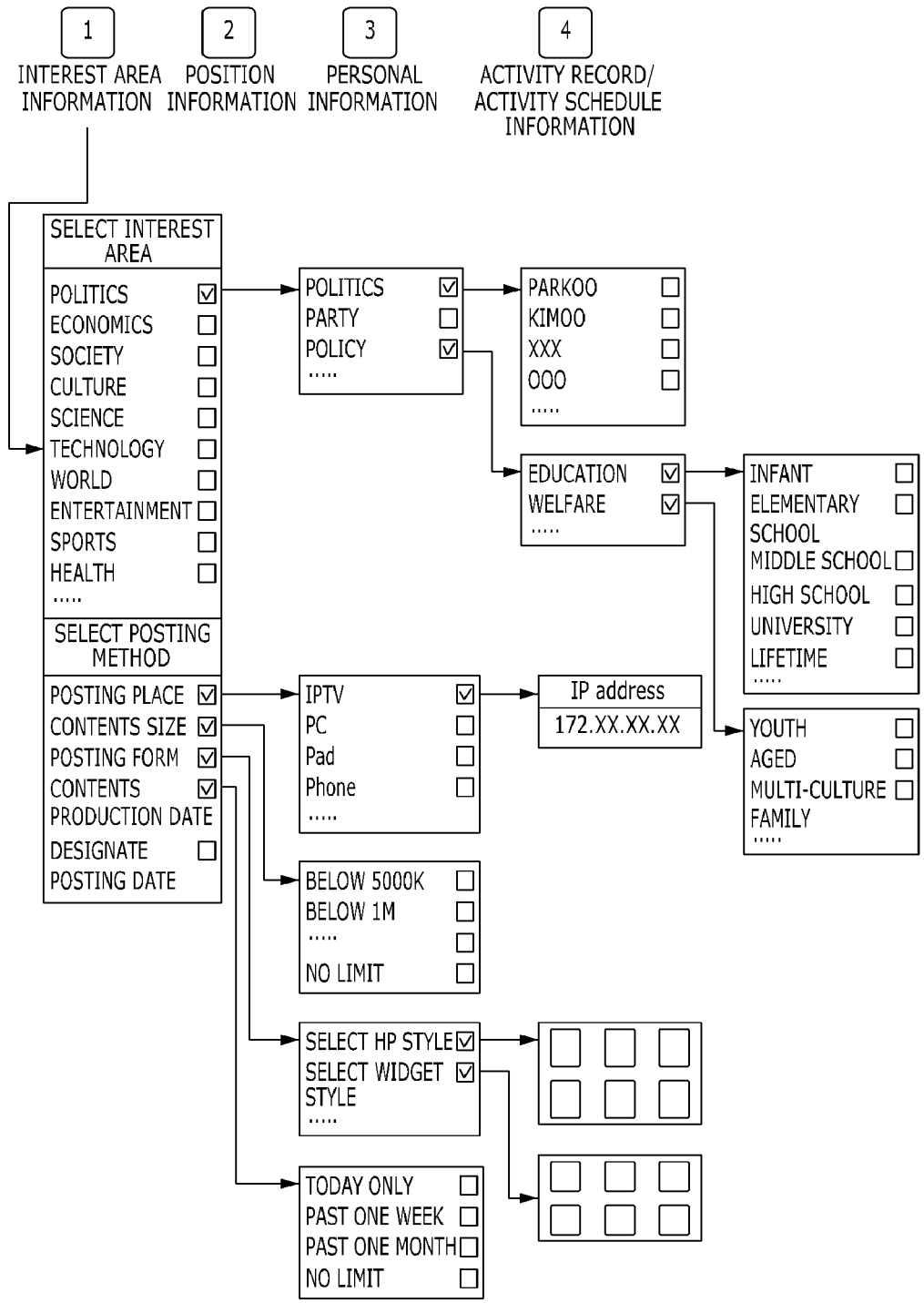
FIGS. 3A to 3D illustrate processes of posting contents order information as metadata elements.

FIG. 3A illustrates a case in which a user selects the interest area information icon. In FIG. 3A, the interest area information includes metadata elements such as 'Politics', 'Economics', 'Society', 'Culture', 'Science', 'Technology', 'World', 'Entertainment', 'Sports', And 'Health'. Furthermore, the user may select one or more metadata elements.

Each of the metadata elements may include sub metadata, and a final value of the metadata element becomes a specific value. In FIG. 3A, when the user selects 'Politics', the metadata element 'Politics' is subdivided into details of 'Politician', 'Party', 'Policy' and so on. Furthermore, when the user selects 'Politician', the metadata element 'Politician' is subdivided into metadata elements representing politician names such as 'Park 00', 'Kim 00', 'xxx', and 'OOO'.

When the user also selects 'Policy' together, the metadata element 'Policy' is subdivided into 'Education', 'Welfare' and so on. 'Education' is subdivided into 'Infant', 'Elementary School', 'Middle School', 'High School', 'University', 'Lifetime' and so on, and 'Welfare' is subdivided into 'Youth', 'Aged', 'Multi-Culture Family' and so on. The contents order metadata generator 302 posts the subdivided metadata on the user terminal.

As the metadata are subdivided in such a manner, the order information is gradually specified. That is, as the metadata elements are selected in the order of 'Politics'→'Politician'→'Park XX', the interest area information approaches a specific value.

As described above, the metadata elements in this embodiment of the present invention are defined according to the sub/super relation, the inclusion relation, or the equivalent relation between upper elements and lower elements. At this time, the metadata elements for providing user-customized contents are generated in response to the ontology which is created according to knowledge of each area.

In FIG. 3A, 'Select Posting Method' shows a metadata structure for deciding a posting condition for contents ordered by a user. The contents posting method is used in each of the interest area information, the position information, the personal information, and the activity record/activity schedule information. Furthermore, when it is assumed that the user's order information is selected for all of the four areas, metadata may be provided as one item or separate items to the user.

Metadata elements of 'Select Posting Method' are also generated by the above-described ontology and given for all of the order information areas, and the user may set a condition by himself/herself.

Referring to FIG. 3A, 'Select Posting Method' is subdivided into 'Posting Place', 'Contents Size', 'Posting Form', 'Production Date', 'Designate Posting Date' and so on. 'Posting Place' indicates the user terminal 100 such as IPTV, desktop PC 100b, smart pad 100c, or smart phone 100a, and the user may select a terminal type through which the user wants to receive contents. For example, when the user selects an IPTV, an element asking the IP address of the user's IPTV may be activated. When the user performs metadata selection on the IPTV, the contents order information DB generator 304 may extract the IP address of the user's IPTV even though the user does not write the IP address in person.

'Contents Size' represents a contents volume, and is subdivided into 'Below 500K', 'Below 1M' and so on. 'Posting Form' is subdivided into 'Select HP Style', 'Select Widget Style', and so on. Although not shown, 'Designate Posting Date' is subdivided into elements for selecting or writing a date and a time at which contents ordered by a user are to be provided.

As such, when the user selects a posting method according to 'Posting Place', 'Contents Size', 'Posting Form', 'Production Date', and 'Designate Posting Date', the user may receive the ordered contents through a simple operation for turning on a smart phone or smart pad. That is, the user may receive the ordered contents at a desired time through a desired terminal by a desired volume.

Figure 3B:
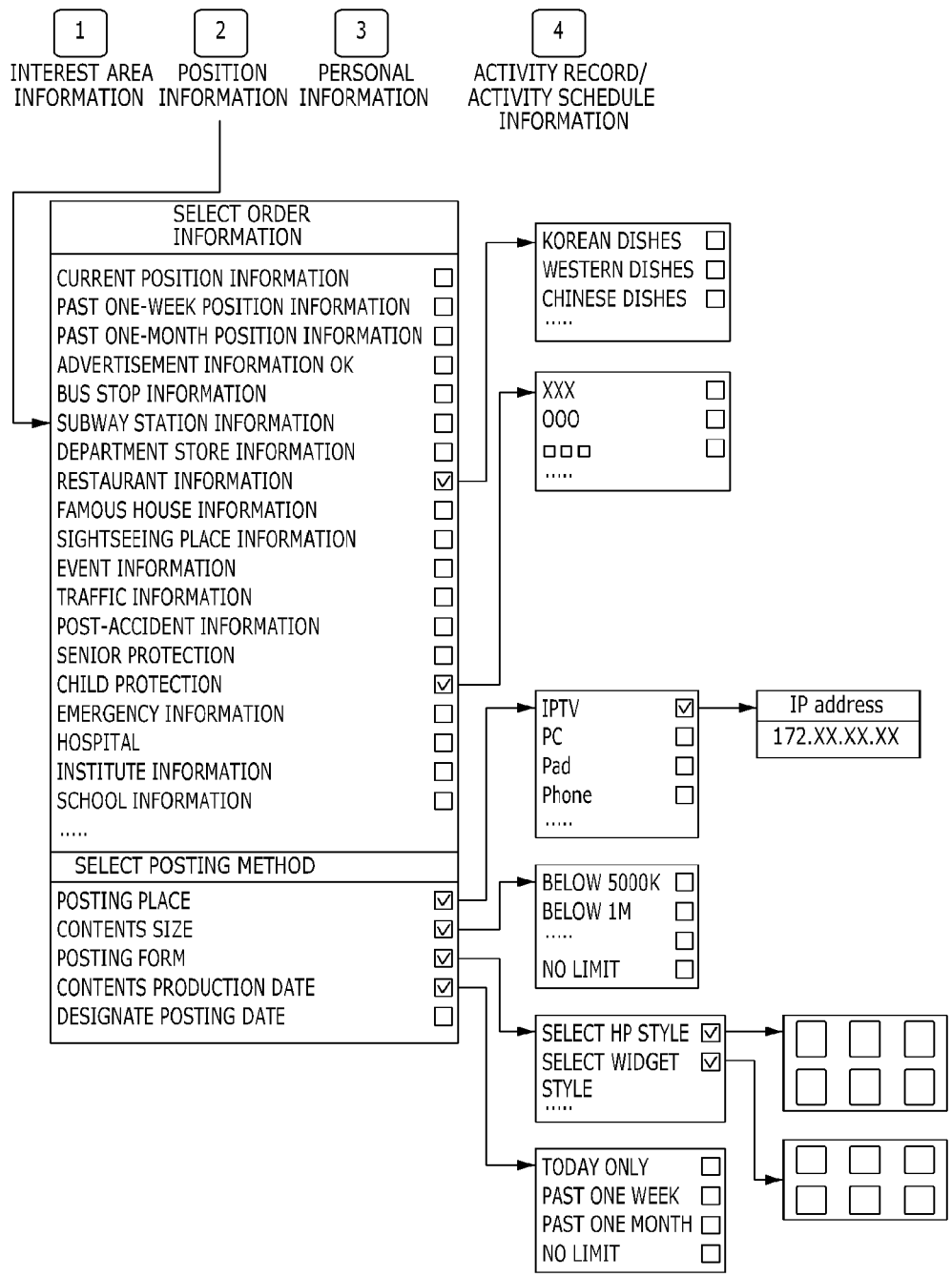

FIG. 3B illustrates a case in which the user selects the position information icon. In this case, metadata elements related to the position information of the user, such as 'Current Position Information', 'Past One-week Position Information', and 'Past One-month Position Information', are provided to the user. The position information of the user may be provided based on latitude and longitude data extracted by a GPS mounted in the user terminal 100 and address data provided by a map service.

Such data as the current position information of the user are not written by the user, but may be directly provided from the user terminal 100 according to a user's approval. For another example, the user may write his/her position information in person.

Meanwhile, metadata elements such as 'Advertisement Information' and 'Event Information' indicate metadata for ordering advertisement information or event information related to the user's position based on the position information of the user, when the current position information or recent position information of the user is provided to the user-customized contents providing server 300.

Figure 3C:
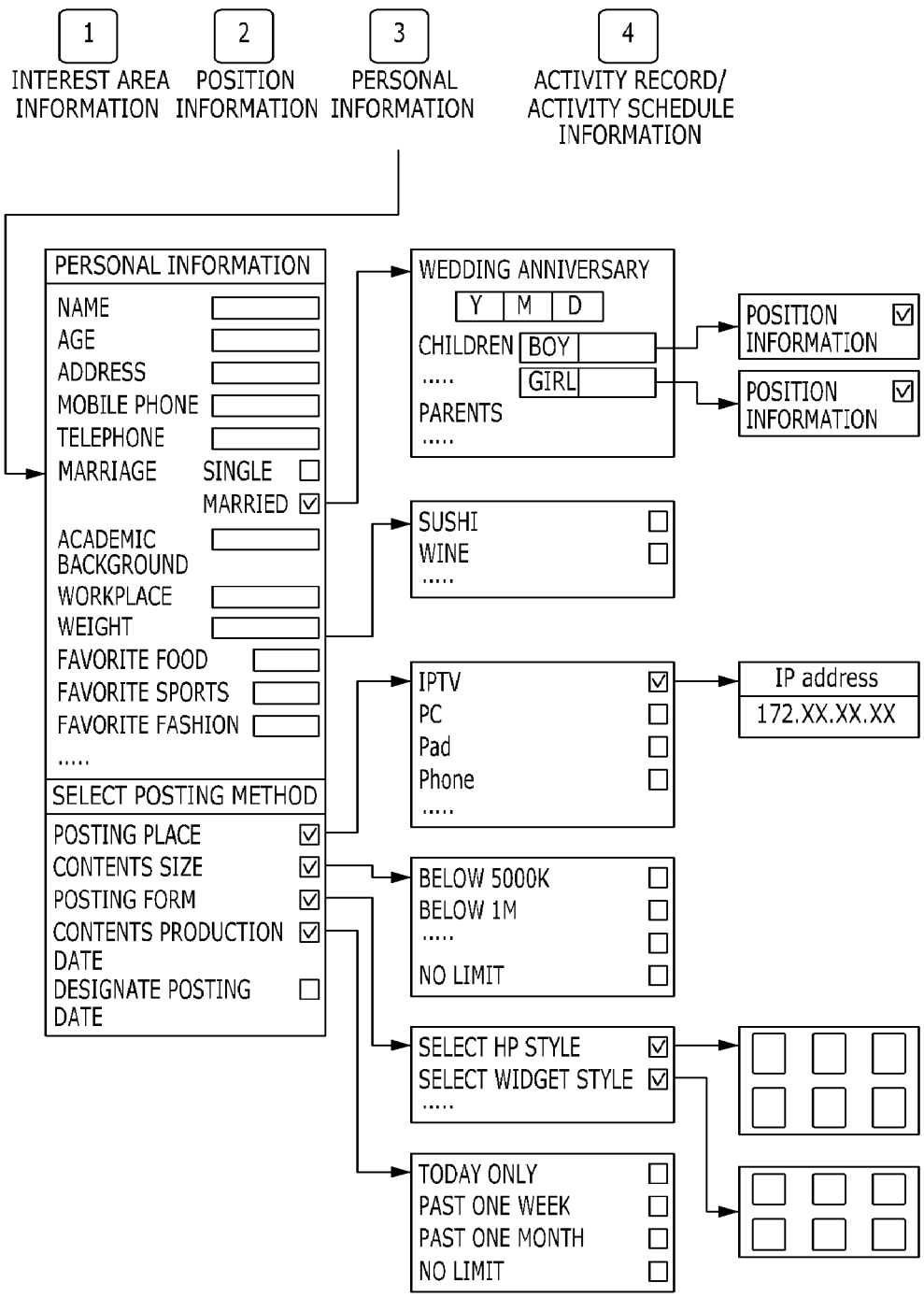
Figure 3D:
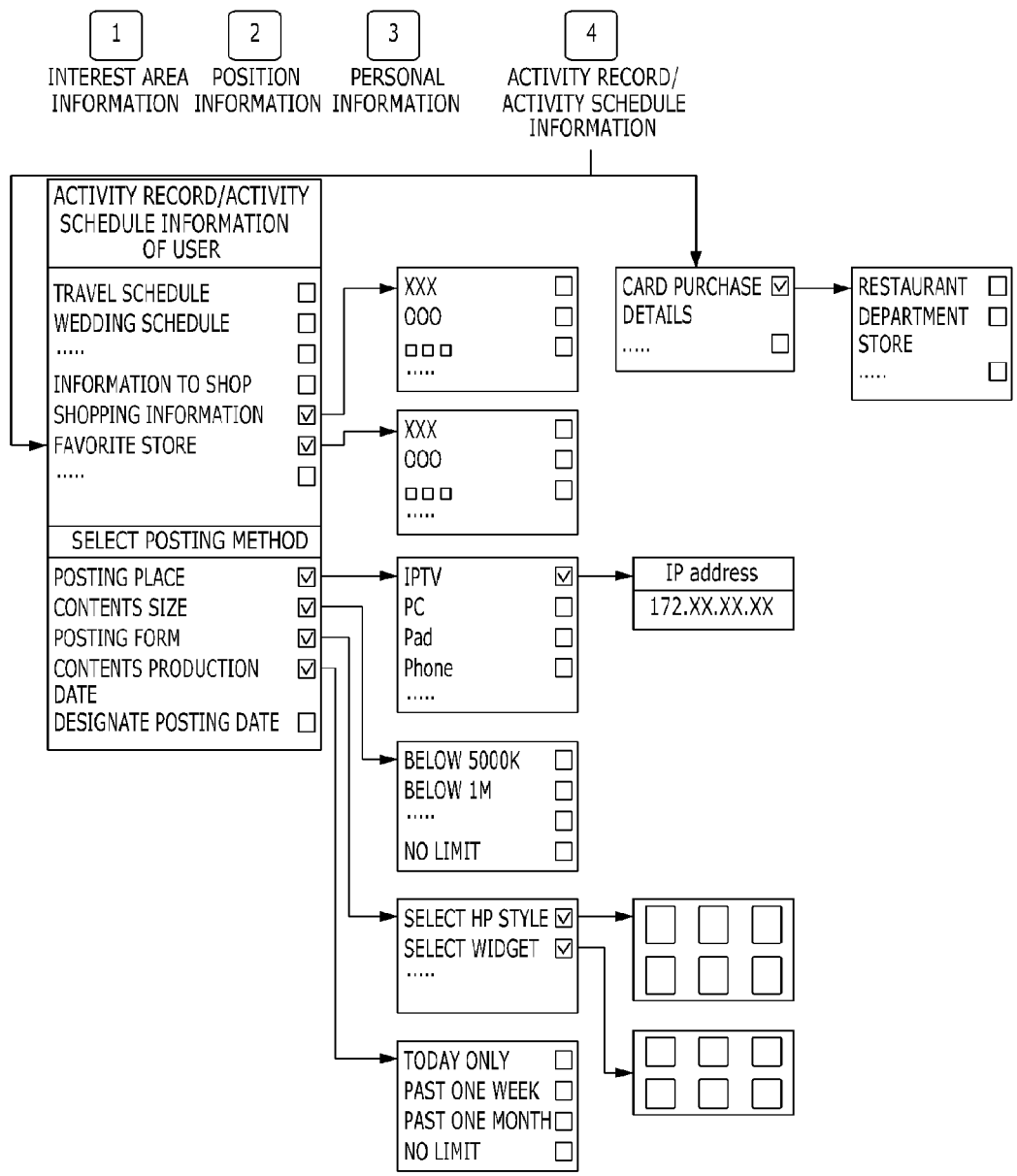

In FIG. 3B, the user may select or write an order for a posting method. In FIGS. 3C and 3D, the user may also select or write an order for a posting method in the same manner. Since this has been already described with reference to FIG. 3A, the duplicate descriptions are omitted herein.

FIG. 3C illustrates a case in which the user selects the personal information icon. The personal information is subdivided into metadata such as 'Name', 'Age', 'Address', and 'Mobile Phone'. For example, when the user selects 'Married' of 'Marriage', the user may write or select information on wedding anniversary and children in lower metadata elements of 'Married'.

When the user wants to order contents related to position information of children (for example, school or the like), the user may additionally select position information provision of the children.

The personal information may include metadata such as 'Favorite Food', 'Favorite Sports', and 'Favorite Fashion'. The preference information of the user may be used when the user orders contents related to the preference of the user.

FIG. 3D illustrates a case in which the user selects the activity record/activity schedule information icon. The activity record/activity schedule information includes metadata for writing past activity details and future activity details such as shopping information.

So far, the processes in which the contents order metadata generator 302 generates metadata and provides the generated metadata to the user terminal 100 has been described with reference to FIGS. 3A to 3D. Here, the metadata elements representing a user's contents order form are expressed as a vocabulary (words). In this embodiment, the vocabularied metadata elements are referred to as metadata element names.

The vocabulary may systemize order information as relations representing abstract ideas. That is, the area knowledge of the user order information may be classified and systemized into the sub/super relation, the inclusion relation, or the equivalent relation between words. Accordingly, the structure of the metadata elements may be expanded and defined like a vocabulary dictionary. In this embodiment, this is referred to as 'ontology'. The respective words forming the ontology may be defined as the sub/super relation, the inclusion relation, or the equivalent relation, and the relations between the words may be expressed as a tree structure.

That is, a relevant word is allocated to each node of the tree structure, and a numerical expression is allocated to the word of each node. In this embodiment, the numerical expression is referred to as an ontology structure value. Since the metadata elements for the order information of user-customized contents are generated based on the ontology, the ontology for the order information is used as a metadata generator in this embodiment of the present invention.

Furthermore, the ontology may be shared with contents providers to provide information on contents.

In conclusion, the ontology serves as a generator for generating metadata elements as order information or provision information which is expressed to order or provide user-customized contents, and is also used for an expressive frame of metadata for providing contents and used for contents filtering using the expressive frame.

Figure 4:
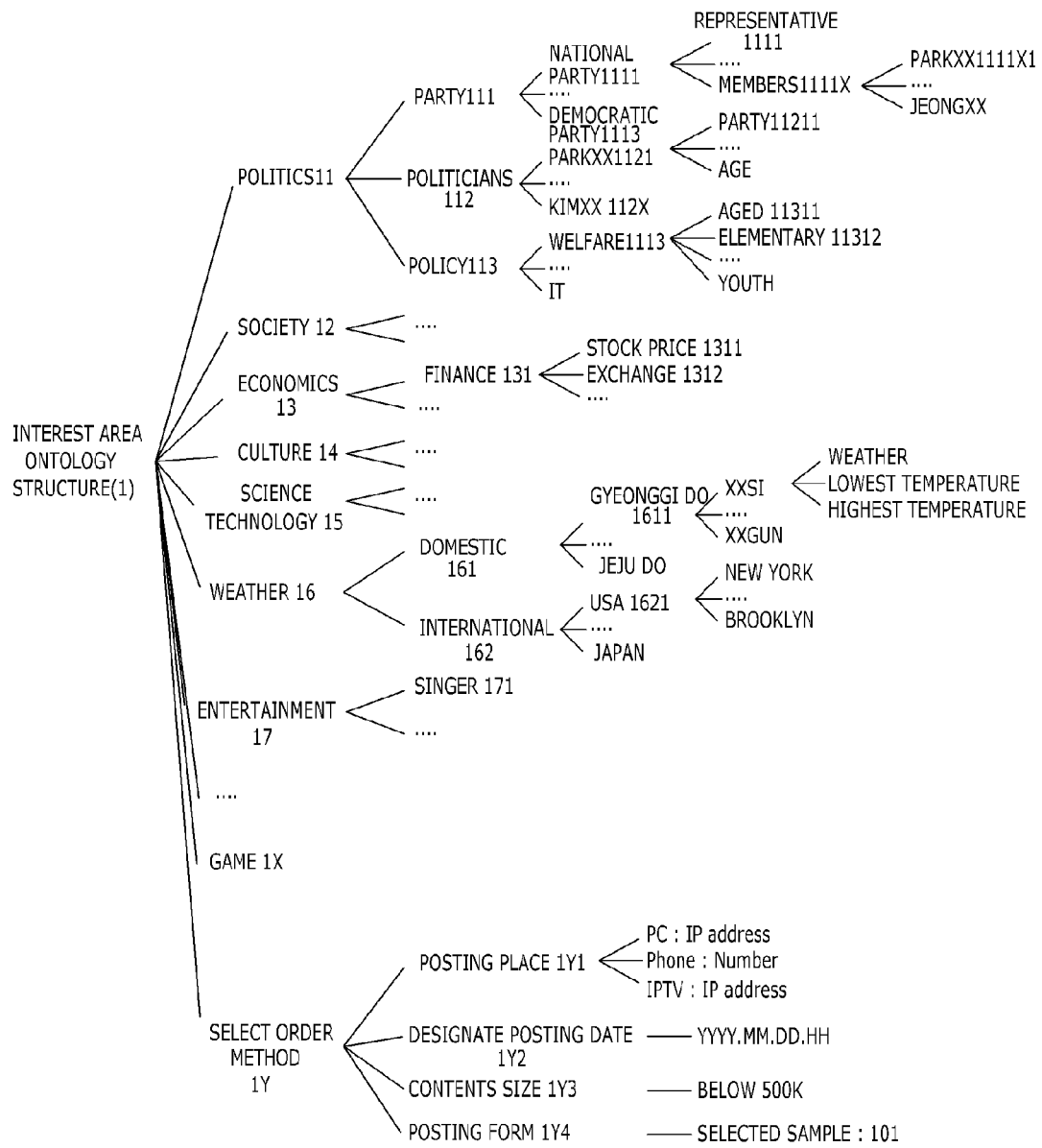
FIG. 4 illustrates an ontology structure of interest area information.

FIG. 4 illustrates an ontology structure of the interest area information. The interest area information is divided into categories including 'Politics', 'Science', 'Economy', 'Science Technology', 'Weather', 'Entertainment', 'Game' and so on, and each category may be subdivided. For example, 'Politics' may include attributes defined as 'Party', 'Politicians', 'Policy' and so on. Furthermore, 'Party' may include attributes subdivided into 'Grand National Party', 'Democratic Party' and so on, and 'Grand National Party' may include attributes subdivided into 'Representative', 'Members' and so on.

As such, the attributes of each area are referred to as 'metadata elements' in this embodiment, and the word expressions of the metadata elements, that is, the relations between the vocabulary groups are defined as 'ontology structure'. As shown in FIG. 4, the numerical expressions attached to the words representing the respective attributes are defined as 'ontology structure values'.

Meanwhile, the interest area ontology structure and other ontology structures which will be described with reference to FIGS. 6, 8, and 10 include metadata elements for the contents posing method as described with reference to FIGS. 3A to 3D.

Figures 5, 6:
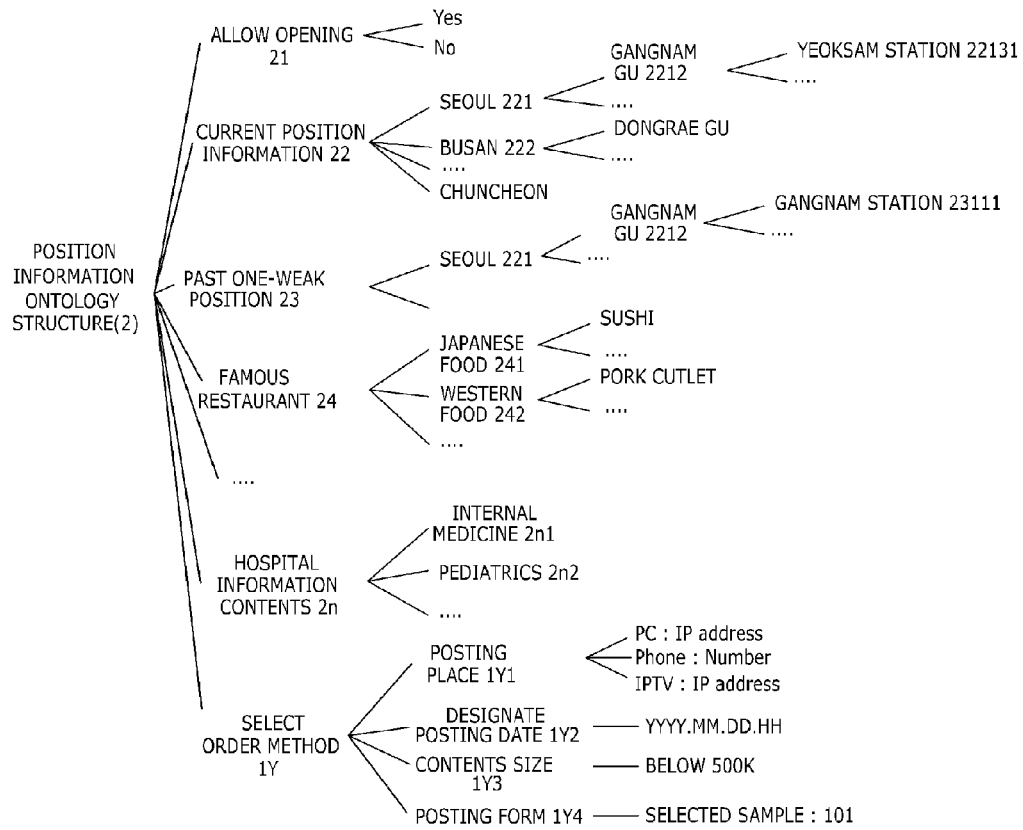
FIG. 5 shows a data table of a metadata DB for the interest area information.
FIG. 6 shows an ontology structure for position information.

FIG. 5 shows a data model of a metadata DB for the interest area information, which is represented in a table form. The data model includes record attributes such as user ID, metadata element name, ontology structure value, and posting method. Referring to FIG. 5, it can be seen that 'Park XX' as a lower element value has an ontology structure value indicating 'Politics', 'Party', 'Grand National Party', and 'Member'. In the contents posting method, when the posting place corresponds to an IPTV, the IP address of the IPTV is stored, and when the posting place corresponds to a smart phone, the phone number of the smart phone is stored.

FIG. 6 shows an ontology structure for the position information. The ontology structure for the position information includes ontology structure values starting with '2'. For example, when the current position information of a user indicates 'Yeoksam Station', the ontology structure value corresponds to '22131'. FIG. 6 shows an example of an ontology structure which enables a user to order contents related to the user's position information, such as restaurant information and hospital information, according to whether or not the user allows the position information to be opened or provided.

FIG. 7 shows a data model of a metadata DB for the position information, which is represented in a table form. The data model includes attributes such as user name, metadata element name (position information), position designation, ontology structure value, order contents type, and posting order element, and each value includes an area name or a number. Such a data table may be generated by selecting or creating metadata according to the method as shown in FIG. 3B.

Figure 8:
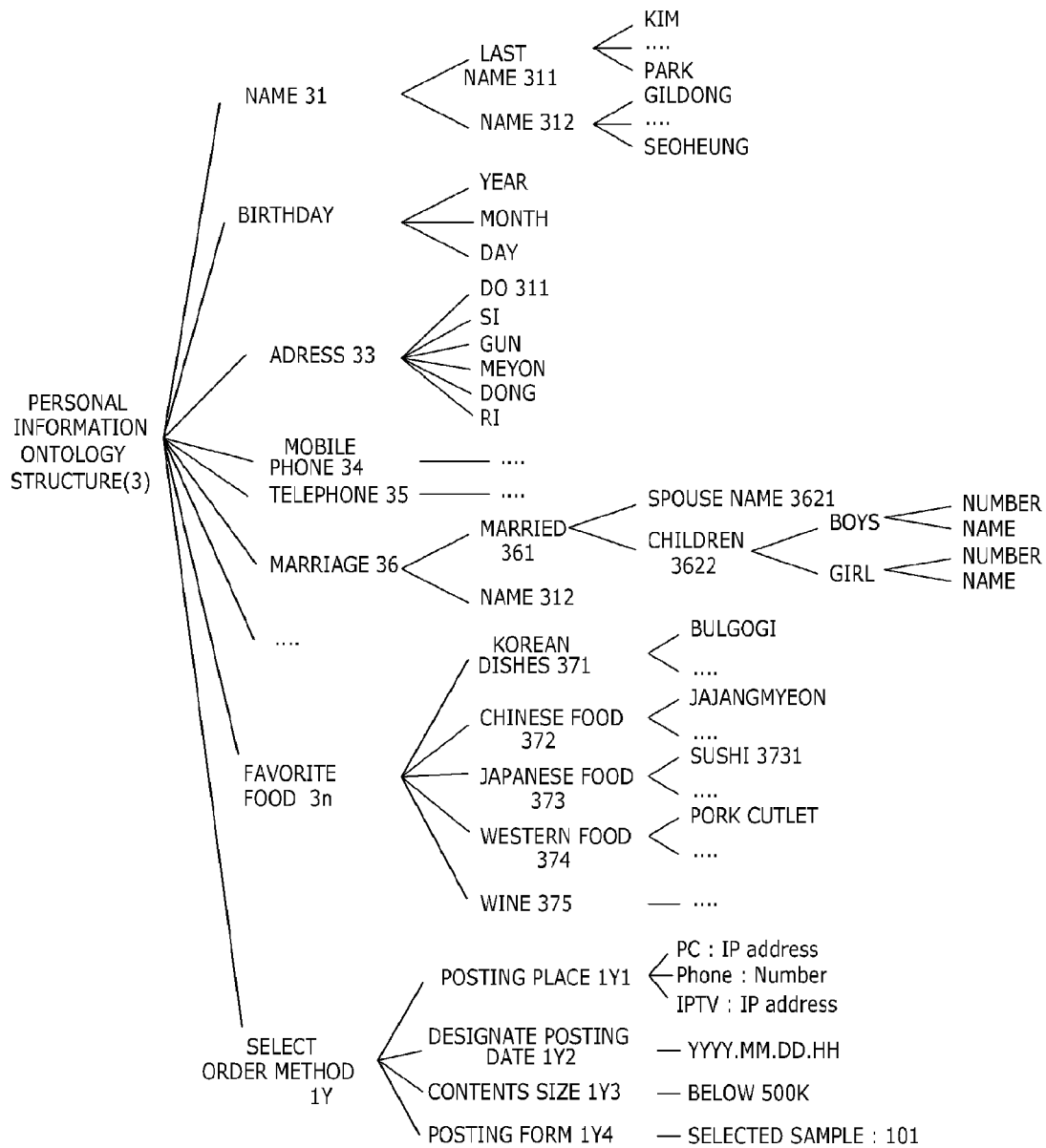
FIG. 8 shows an ontology structure for personal information.

FIG. 8 shows an ontology structure for the personal information. The ontology structure of FIG. 8 has such a tree structure as described above. The ontology structure for the personal information includes ontology structure values starting with '3'. For example, 'Last Name' of 'User Name' has an ontology structure value of '311'.

The ontology structure of the personal information may be used when a user wants to receive relevant contents instead of opening the personal information of the user, and the provision of contents related to hobby and preference may be expected.

Figures 9, 10A:
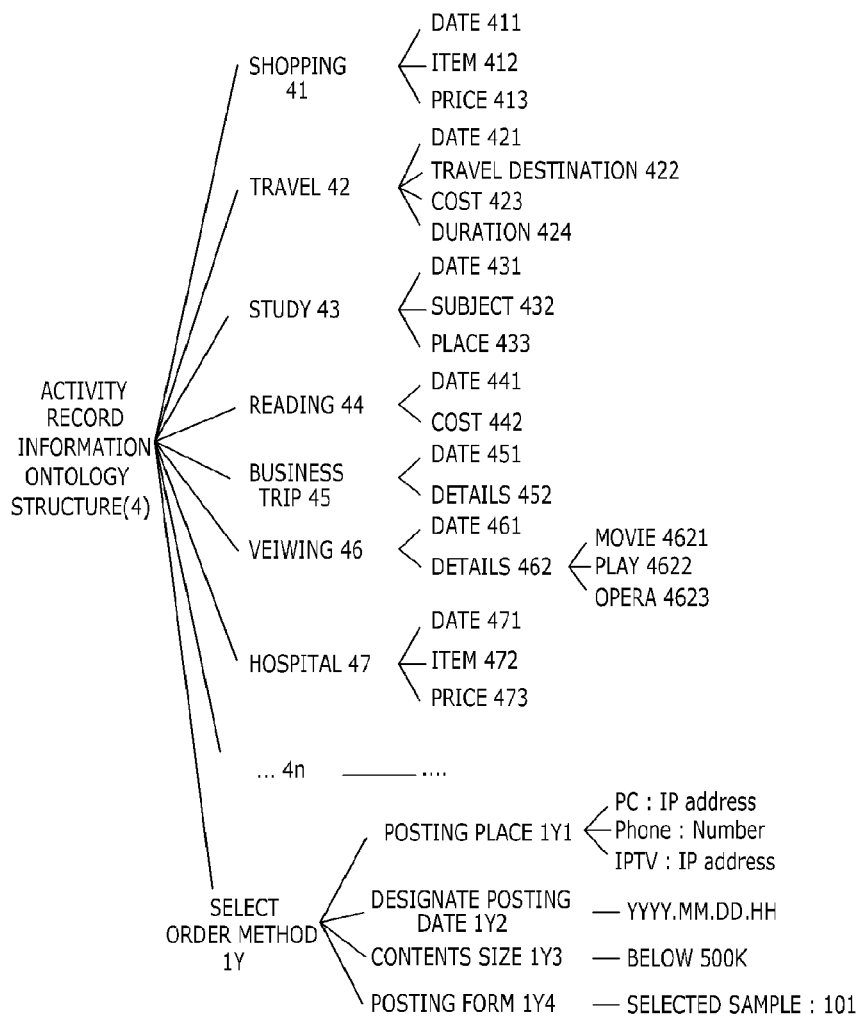
FIG. 9 is a data table of a metadata DB for the personal information.
FIG. 10A shows an ontology structure for activity record information.

FIG. 9 is a data model of a metadata DB for the personal information, which is represented in a table form. The data model includes attributes such as user name, birthday, telephone number, marriage, favorite food. When a user performs a selection box check of Yes or No or character input while the contents order information is inputted as described with reference to FIG. 3C, such values as shown in the data table of FIG. 9 are obtained.

Figure 10B:
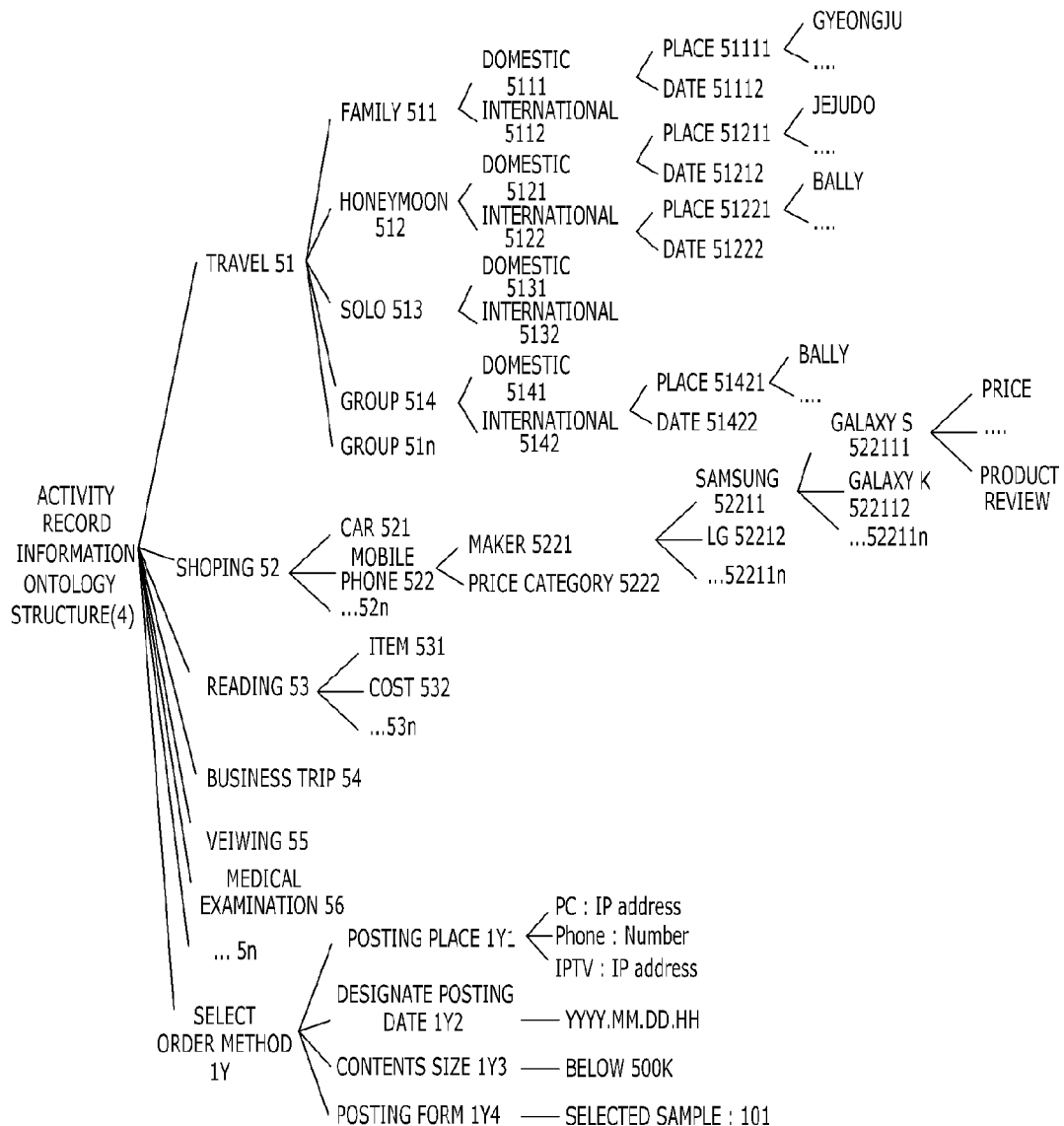
FIG. 10B shows an ontology structure for activity schedule information.

FIGS. 10A and 10B show ontology structures for the activity record/activity schedule information. FIG. 10A shows an ontology structure related to user's past activity records, and FIG. 10B shows an ontology structure related to user's activity schedules. Since the information of the activity records is closely connected with the information of the activity schedules, the information may be provided according to the same ontology structure.

When the ontology structures of FIGS. 10A and 10B are used, the user may open information on the user's shopping records and receive useful contents related to the purchased products. Furthermore, the user may open the activity schedule information and receive relevant contents.

Figures 11, 12:
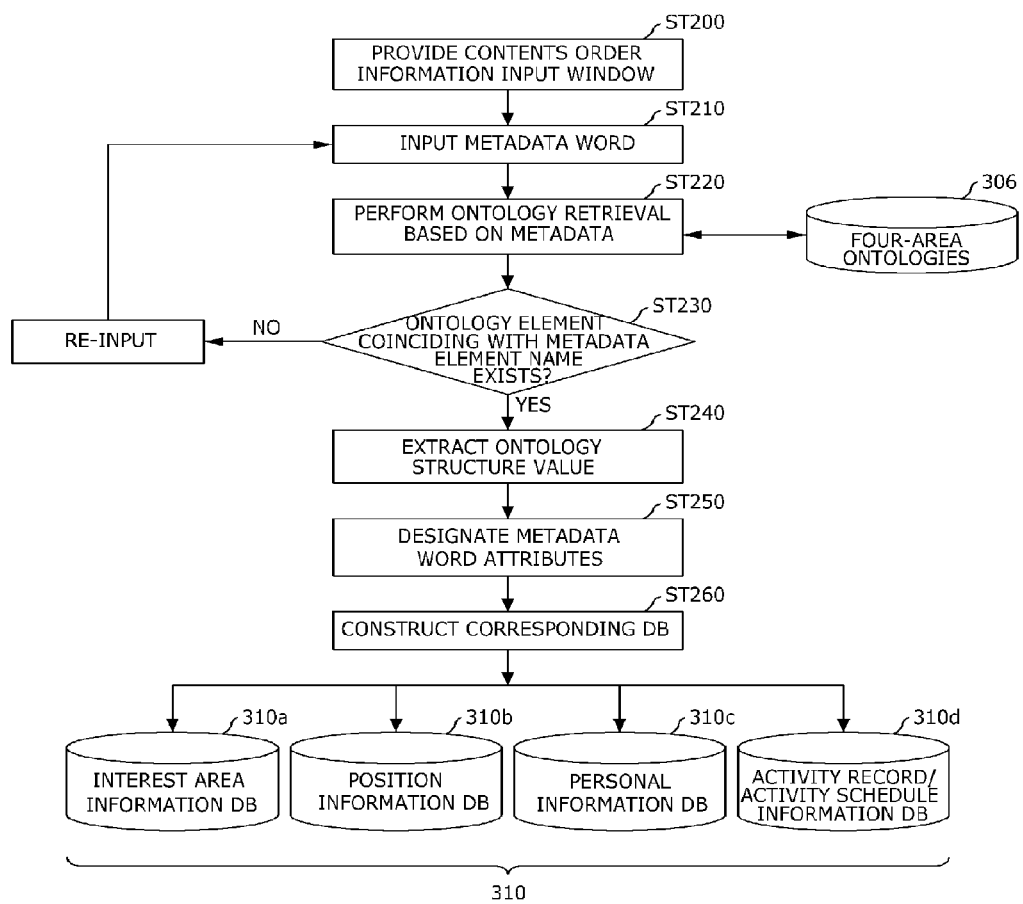
FIG. 11 shows a data table of an activity record/activity schedule DB.
FIG. 12 shows another example of constructing a contents order information DB.

FIG. 11 shows a data model for constructing an activity record/activity schedule DB according to the result obtained by opening the activity record/activity schedule information and writing order information on desired contents, which is represented in a table form.

The ontology structures and the record attributes of the DBs as shown in FIGS. 6 to 11 include metadata elements for providing user-customized contents in a designated form, through a designated terminal, by a designated volume, and at a designated time.

So far, the process of constructing the contents order information DB has been described with reference to FIGS. 3 to 11. In the above-described embodiment, the user-customized contents providing server 300 generates metadata elements for the four areas (the interest area information, the personal information, the position information, and the activity record/activity schedule information) using the prepared ontology 306, and provides the generated metadata elements to the user terminal 100. Then, the user selects or writes a metadata element suitable for order information on the user's terminal, and then transmits the contents order information to the user-customized contents providing server 300.

That is, the above-described method is a so-called top down methodology which develops from the root as the uppermost node into lower classes, and is useful to a user who has a certain amount of knowledge for the ontology structure of each area, that is, contents.

Meanwhile, the above-described method is unfavorable to a user who has vague knowledge or only fragmentary keywords for desired contents. Therefore, the present invention provides another order information expression frame which is different from the above-described method. In a method which will be described below, a user inputs a metadata element name of desired contents as a character string or word, unlike the above-described method in which metadata elements are provided by stages such that a user may select metadata elements.

FIG. 12 shows an example in which a user inputs metadata elements for desired contents in person such that the contents order information DB is constructed.

Referring to FIG. 12, the user-customized contents providing server 300 provides a contents order information input window to a user at step ST200. When the user opens the contents order information input window on the user's terminal and inputs a character string related to desired contents at step ST210, the server performs ontology retrieval using a metadata element name of the word inputted by the user as a keyword, at step ST220. At this time, all of the four ontology structures described with reference to FIGS. 4, 6, 8, and 10 may be used.

The ontology retrieval is performed according to a bottom-up search method which develops from the lower part to the upper part of the ontology. While the search is performed, whether an ontology element coinciding with the metadata element name inputted by the user exists or not is determined at step ST230. When there is no element coinciding with the metadata element name, the process returns to the step ST210 to request the user to re-input a metadata element name.

When a coinciding element occurs during the search process, branches directed to the root from the node of the ontology are collected and designated as a number to extract an ontology structure value, at step ST240. Then, metadata word attributes are designated from the extracted ontology structure value at step ST250.

Then, the contents order information DB 310 is constructed by using the word of the inputted metadata element name as a record attribute, at step ST260. The contents order information DB may be constructed in the same manner as the above-described DB construction methods.

For example, when a user inputs 'exchange rate' as a metadata element name through an input window, the user-customized contents providing server 300 starts search for the four ontology structures. Referring to FIG. 4, since 'exchange rate' is matched with a node of the interest area ontology, '1312' may be extracted as an ontology structure value of 'exchange rate'.

Therefore, a DB of the user's order information is constructed in the interest area information DB 310*a* in a state where the ontology structure value '1312' of 'Exchange Rate' is set to an attribute. When it is determined at the step ST230 that the metadata element name inputted by the user coincides with node of a plurality of ontologies, a plurality of ontology structure values are stored in the DB.

As such, the metadata elements and the ontology structures may be used when receiving contents order information from users. Furthermore, the metadata elements and the ontology structures also play an important role in a contents filtering process based on the contents order information of the user.

As described above, the contents order method is divided into two methods. However, users may order contents according to another contents order method using metadata elements and ontology structures, and the above-described two methods may be used together.

The contents order information DB 310 for ordering user-customized contents may be implemented by a typical relational data base management system (RDBMS). The contents order information DB 310 includes the interest area information DB 310*a* for providing the interest area information of the user, the position information DB 310*b* for providing the position information of the user, the personal information DB 310*c* for providing the personal information of the user, and the activity record/activity schedule information DB 310*d* for providing the activity record/activity schedule information of the user.

Each of the data tables of FIGS. 5, 7, 9, and 11 may correspond to a data model of the contents order information DB 310. Furthermore, the contents order information DB 310 may also be implemented by a resource description framework model (RDF) and an extensible markup language (XML) DB as in the Semantic Web. Furthermore, the contents order information DB 310 may also be implemented by a DB using XHTML, HTML 5.0 or the like based on the markup language.

FIG. 13 shows an example in which the metadata elements of the interest area information DB 310*a* as shown in FIG. 5 are expressed by XML. More specifically, the metadata element values in the table form of FIG. 5 are generated by XSLT which is a metadata expression form. The XSLT is a style sheet language of XML. A difference between the method implemented by RDMBS and the method implemented by the XML DB is that a computer storage method and a DB search method differ depending the implementation method. Furthermore, the former method is a mature computer S/W methodology, but the latter method is a growing methodology. However, although any one of the methods is used, the same result is obtained in the embodiment of the present invention.

So far, the process of receiving contents order information from users and constructing the contents order information DB 310 has been described. As the contents order information of users is databased, the order statuses and information of the entire users may be managed and used in real time. Subsequently, a method for opening the contents order information DB to contents providers will be described.

Figures 14, 15A:
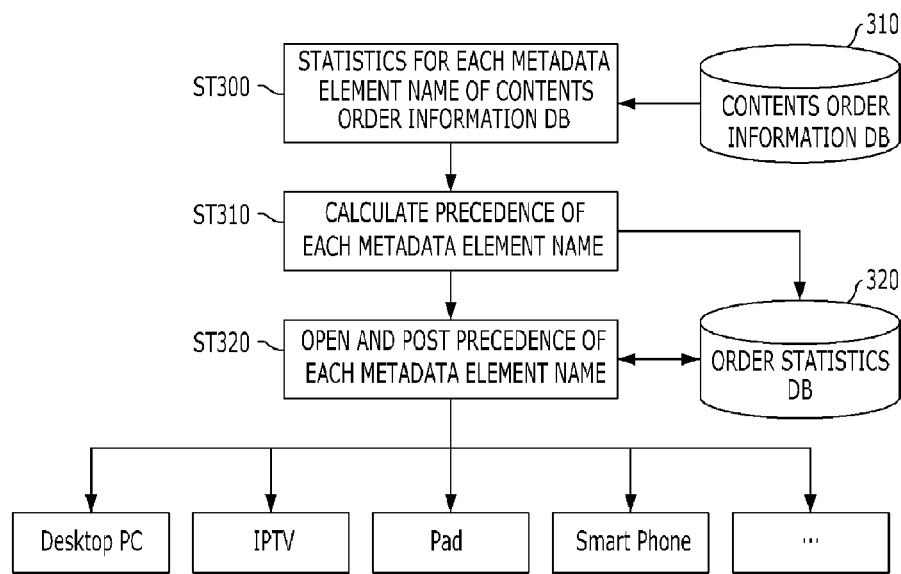

FIG. 14 is a flow chart showing an example of opening the contents order information DB. FIG. 14 shows an operation of the contents order information opener 312 of the system illustrated in FIG. 1.

When the above-described contents order information DB 310 for contents orders of users is completely constructed, a procedure of opening the contents order information DB 310 is performed. Referring to FIG. 14, the process is started by acquiring statistics for each metadata element name of the contents order information DB 310 at step ST300. During this step, the contents order information DB 310 is referred to.

During the step ST310, the statistics of metadata elements selected by users are acquired for each of the four-area DBs of the contents order information DB 310. For example, the sum of metadata elements selected by users may be acquired for the interest area information DB 310*a*. Furthermore, statistics for the total number of users at a specific position or statistics for positions where a large number of users gather may be acquired for the position information DB 310*b* during this step. Furthermore, statistics for metadata element names which are frequently most by users may be acquired for the personal information DB 310*c* and the activity record/activity schedule information DB 310*d*.

Subsequently, the precedence of each metadata element name is calculated based on the statistics at step ST310. During the step ST310, a maximum value or minimum value may be set for each condition. For example, a politician having the largest number of contents orders among the metadata elements of 'Politician', a position where the largest number of users gathers in the current position information, or a time zone where the largest number of users gathers at a specific position may be calculated during this step.

Furthermore, the precedence may be calculated for statistics of metadata elements based on the personal information opening and statistics of metadata elements based on the activity record/activity schedule information opening.

Subsequently, the statistics and precedence calculated during the above-described process are stored in and managed by the contents order statistics DB 320, and the precedence of each metadata element name is opened and posted at step ST320. The precedence may be posted on all user terminals 100 connected to the wired/wireless network 200, including a smart phone 100*a*, a desktop PC 100*b*, a smart pad 100*c*, a notebook, and an IPTV which receive the user-customized contents service.

FIGS. 15A to 15C show data models of the contents order statistics DB 320. The contents order statistics DB 320 includes record attributes such as metadata element name, order number, and ontology structure value, which may utilized as a search keyword. Among the attributes, the ontology structure value indicates to which ontology structure a metadata element name belongs. The ontology structure value not only may be used for user's reference, but also may be referred to by contents providers or contents providing agencies.

Figure 16:
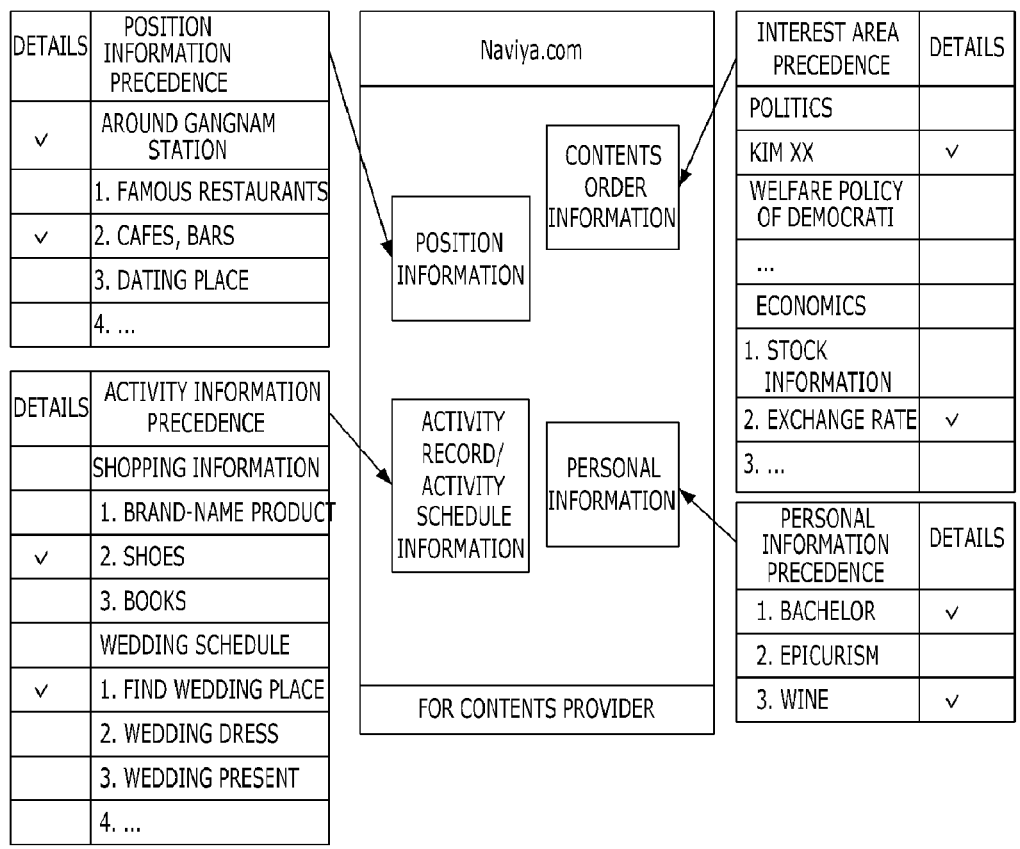
FIG. 16 shows an example in which user's order information is posted on a desktop PC.

FIG. 16 shows an example in which the user's order information is posted on the desktop PC 100*b*. Referring to FIG. 16, four order information request areas for constructing the contents order information DB 310 is displayed on the screen of the user terminal 100. When the user selects any one area (for example, an icon), detailed information for each order information may be confirmed through a pop-up window of each area. For example, the user may confirm the order information on who ordered contents, when and where contents were ordered, and which contents were ordered, at a glance.

The user's order information posted at the step ST320 of FIG. 14 may be read by any one anywhere and anytime. According to the opened order information, contents may be provided to anyone, or anyone may provide contents. For example, a users' interest area, a place where the largest number of users gather, the number of unmarried people, the number of epicures, and users' shopping details and items to be shopped may be figured out according to conditions. Therefore, any contents providers may provide necessary contents in a user-customized form to users according to the order information.

The contents providers require a unit for providing contents provision information matched with the contents order information of users. In this embodiment, metadata elements generated by the same ontology as in the contents order information of users are used as a frame capable of expressing contents provision information of the contents providers.

The contents provision metadata generator 322 of the user-customized contents providing server 300 provides the same data model as the metadata elements for contents orders of users. That is because, when the order information frame (order information metadata elements) of users and the provision information frame (provision order metadata elements) of contents providers are matched with each other, the contents providers may provide necessary contents to the users at a high matching ratio.

Figure 17:
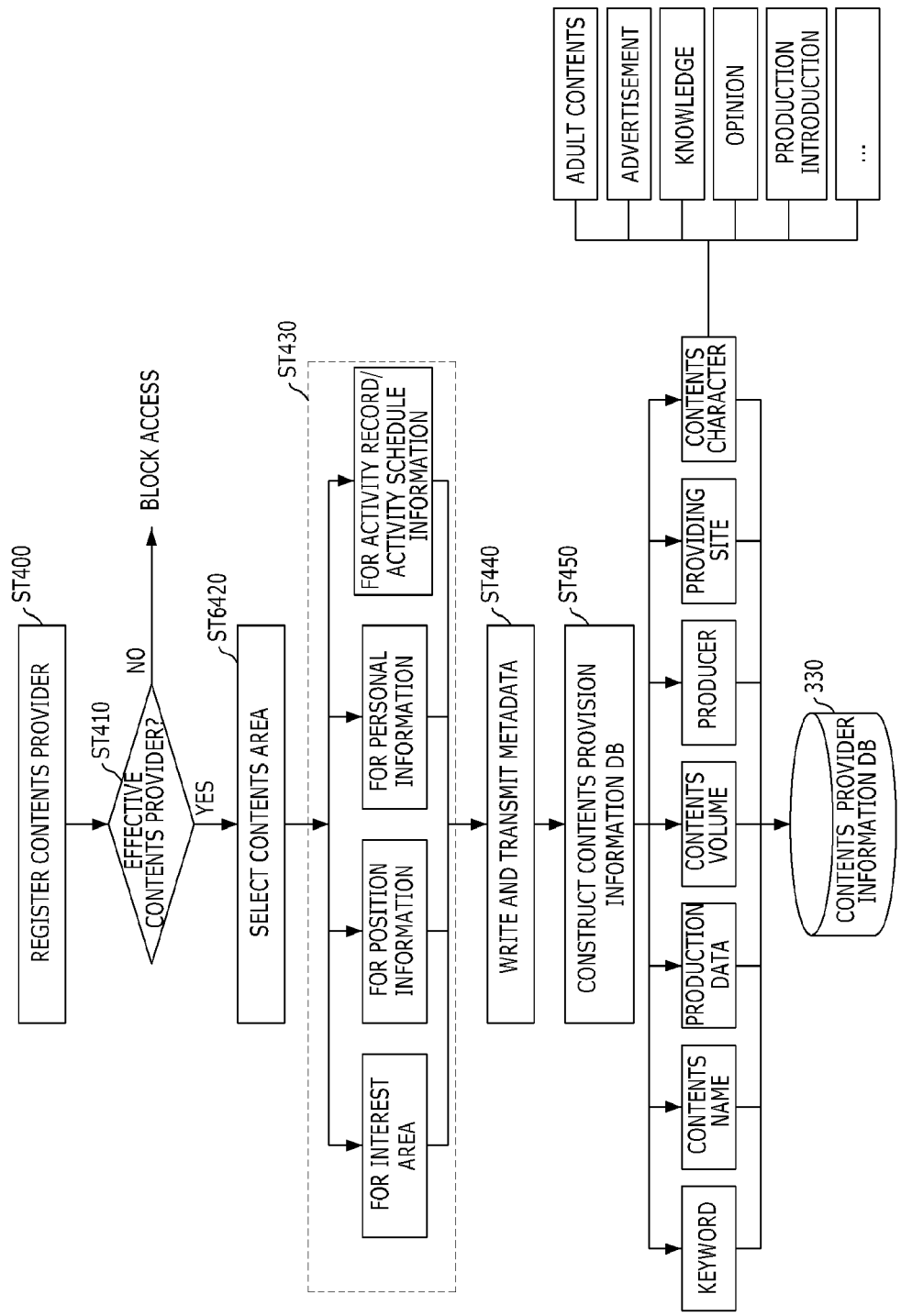
FIG. 17 is a flow chart showing an example in which a contents provider provides contents.

FIG. 17 is a flow chart showing an example in which a contents provider provides contents. FIG. 17 shows a process of constructing the contents provision information DB. Referring to FIG. 17, a process in which a user receives contents for contents order information from the contents provider.

The process is started by registering a contents provider at step ST400. When the contents provider logs in after the registration, an authentication process is performed to determine whether the contents provider is an effective (or registered) contents provider or not, at step ST410. When the contents provider is not an effective contents provider, the access is blocked.

When the contents provider is authenticated as an effective contents provider, the contents provider selects an area of contents which are to provide, at step ST420. Then, metadata elements belonging to each area are posted to the contents provider at step ST430.

When the contents provider selects or writes an area of contents which are to provide, the selected metadata element is transmitted to the user-customized contents providing server 300 at step ST440. The contents provision information DB generator 324 of the user-customized contents providing server 300 constructs the contents provision information DB 330 based on the metadata elements checked by the contents provider at step ST450.

The metadata element groups of the four contents areas are identical to the metadata element groups of the contents order information DB 310, and generated by the above-described same ontologies. Furthermore, metadata elements are defined as keywords for contents retrieval, and stored and managed as record attributes and values of the contents provision information DB 330.

Furthermore, the method for constructing the contents order information DB 310, which has been described with reference to FIG. 12, may also be used for constructing the contents provision information DB 330. The contents provider may access the user-customized contents providing server 300, open a contents provision information input window, and input desired metadata elements as a word.

Then, the user-customized contents providing server 300 performs ontology retrieval using the metadata element name of the word inputted by the contents provider as a keyword. At this time, the user-customized contents providing server 300 performs retrieval on all of the four-area ontologies without designating the metadata element name inputted by the contents provider for a specific area. The four-area ontologies refer to the ontologies described with reference to FIGS. 4, 6, 8, and 10.

The ontology retrieval is performed according to a bottom up retrieval method which develops from the lower part to the upper part of the ontology. When an element coinciding with the metadata element name inputted by the contents provider appears, branches directed to the root from the node of the coinciding ontology element are collected to extract an ontology structure value. Furthermore, the contents provision information DB 330 is constructed by using the extracted ontology structure value and the word of the metadata element name inputted from the contents provider as record attributes.

As the same order information expression frame and interface as the order information expression frame and interface of users are provided to contents providers, it is possible to simplify the contents distribution structure between users ordering contents and contents providers providing contents. Furthermore, the users and the contents providers may share the comfortable interface, even though the positions thereof are changed.

Figures 18, 19:
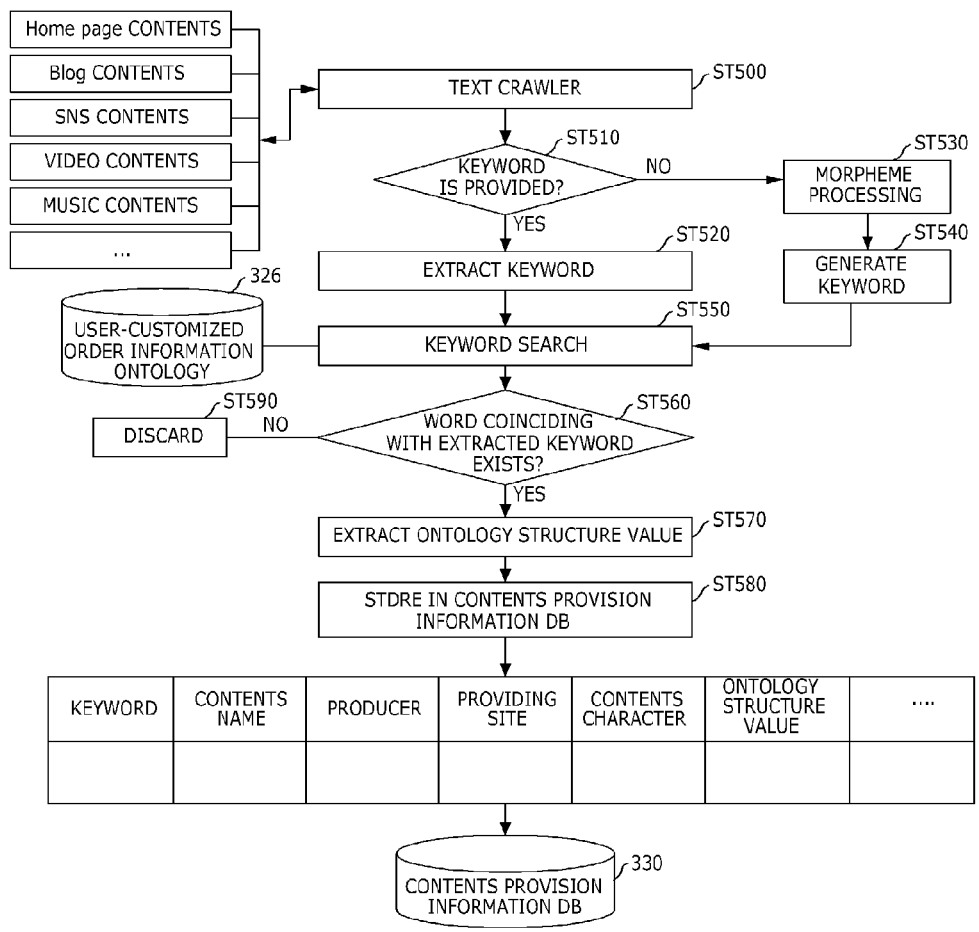
FIG. 18 shows a data table of a contents provision information DB in a table form.
FIG. 19 shows a process in which a text crawler is used to construct a contents provision information DB.

FIG. 18 shows a data model of the contents provision information DB in a table form. Referring to FIG. 18, the contents provision information DB 330 is constructed with attributes including the same keyword as a metadata element name, a contents name, a producer, a production date, an ontology structure value and so on in the frame of the contents order information DB 310. The contents provision information DB 330 may be implemented in the same manner as the contents order information DB 31.

In general, the performance evaluation of an information search engine is based on the precision and recall of information searching. The former is an index related to how precisely information desired by a user is searched, and the latter is an index related to whether or not information is searched from a wide information region.

In the method for providing user-customized contents according to the embodiment of the present invention, evaluation indexes for contents provision matched with contents order may also include precision and recall. In this embodiment, the order information expression frame of users and the provision information expression frame of contents providers are expressed as metadata elements based on the same ontology, which makes it possible to guarantee the precision.

However, when the search target area for user-customized contents is to be widened, that is, recall for contents provision is to be increased, contents areas of contents providers who do not use the method for providing user-customized contents according to the embodiment of the present invention may become a problem. That is because, when the contents provision information is not expressed on the basis of the metadata method which is the expression frame according to the embodiment of the present invention, the contents provision information may deviate from the filtering process of the user-customized contents according to the embodiment of the present invention.

The present invention proposes a framework for another contents providing method, in order for contents provision of contents providers who do not use the metadata method. Key technology of the contents providing method is to match an element word serving as a keyword of a metadata element name in the user-customized contents order information expression frame with provided contents and extract the element word. In this embodiment of the present invention, a metadata element name is extracted from a keyword of provided contents, and the contents provision information DB 330 is constructed in such a manner that the extracted metadata element name has the same structure as metadata element names of the contents information contents DB 310.

FIG. 19 shows a process in which a text crawler is used to construct the contents provision information DB. The process is started as the text crawler collects texts included in contents which may be accessed through a network. The contents may include homepage contents, blog contents, SNS contents, video contents, and music contents as shown in FIG. 19.

Then, whether or not a keyword is provided from the collected texts is determined at step ST510. When a keyword is provided, the keyword is extracted at step ST520. When a keyword is not provided, the collected texts are processed into morphemes at step ST530, and a keyword is generated from the processed morphemes at step ST540. Since most of keywords are expressed as nouns, noun words are selected from the processed morphemes, and a keyword is designated among the noun words. Since the keyword designation process may implemented by various known methods, the detailed descriptions thereof are omitted herein.

The text crawler technology is used in a general information search engine. Furthermore, since the text collection process includes a process of scanning texts included in the contents, a keyword may be extracted from most contents. Since most contents necessarily include a keyword expression as metadata, the keyword may be extracted during the collection process. When a keyword is not extracted, a keyword is generated through morpheme processing.

The extracted keyword is used to perform ontology retrieval on the above-described four-area order information ontologies at step ST550. Then, whether a word coinciding with the extracted keyword is retrieved or not is determined at step ST560. When there is no word coinciding with the extracted keyword, the collected texts are discarded. When a word coinciding with the extracted keyword exists, an ontology structure value is extracted at step ST570. The extracted ontology structure value is stored in the contents provision information DB 330 at step ST580.

So far, the construction of the contents order information DB 310 for ordering user-customized contents and the construction of the contents provision information DB 330 for contents provision of contents providers have been described. In a state where the two DBs are implemented, the following processes are performed. The processes include a process of filtering the contents provided from the contents provider according to a user's order and a process of providing the filtered contents in a user-customized form.

Figure 20:
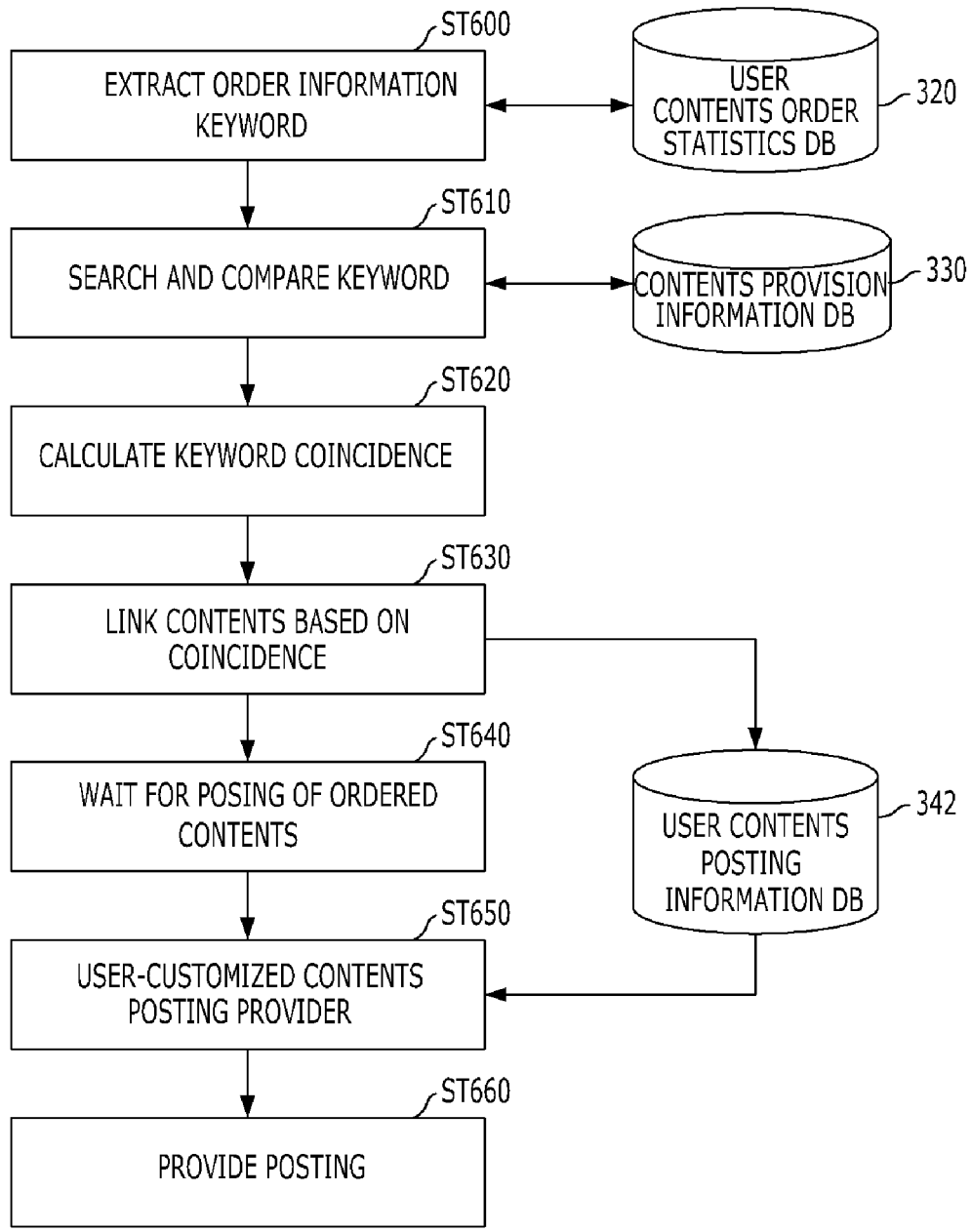
FIG. 20 shows a flow chart showing an example of contents filtering according to the embodiment of the present invention.

FIG. 20 shows a flow chart showing an example of contents filtering according to the embodiment of the present invention. Referring to FIG. 20, a contents filtering process will be described as follows.

The contents filtering processor 332 of the user-customized contents providing server 300 extracts an order information keyword from order information inputted by a user, by referring to the contents order statistics DB 320 at step ST600. The order information keyword may include a metadata element name, for example.

The keyword extracted at the step ST600 is searched and compared from the contents provision information DB 330 constructed as shown in FIG. 17 or 19, at step ST610. Then, coincidence between the contents order information keyword of the user and the metadata element name stored in the contents provision information DB 330 is calculated at step ST620.

The coincidence calculation is performed by comparing ontology structure values for generating metadata. When it is determined that the two metadata elements completely coincide with each other according to the comparison result of the ontology structure values, the process proceeds to step ST630 in which a contents linker performs a link operation.

Meanwhile, when the two metadata elements partially coincide with each other, a coincidence ratio is calculated to endow the coincidence. That is, the coincidence between the metadata element of the ordered contents and the metadata of the provided contents is calculated at percentage (%). The contents having the coincidence are transferred to the contents linker.

The contents linker sequentially links the position data of the contents and the filtered contents. The position data may include a URL, an IP address, or homepage link data, for example. The filtered contents are stored in the contents posing information DB 350 and the user contents posting information DB 344 according to a condition designated by the user, and the process proceeds to a contents posing standby step at step ST640.

Then, the user-customized contents posting provider 342 determines whether the condition designated by the user arrived or not, by referring to the user contents posting information DB 344 at step ST650. When the condition designated by the user arrived, the user-customized contents posting provider 342 posts the contents on the user terminal at step ST660.

Figure 21:
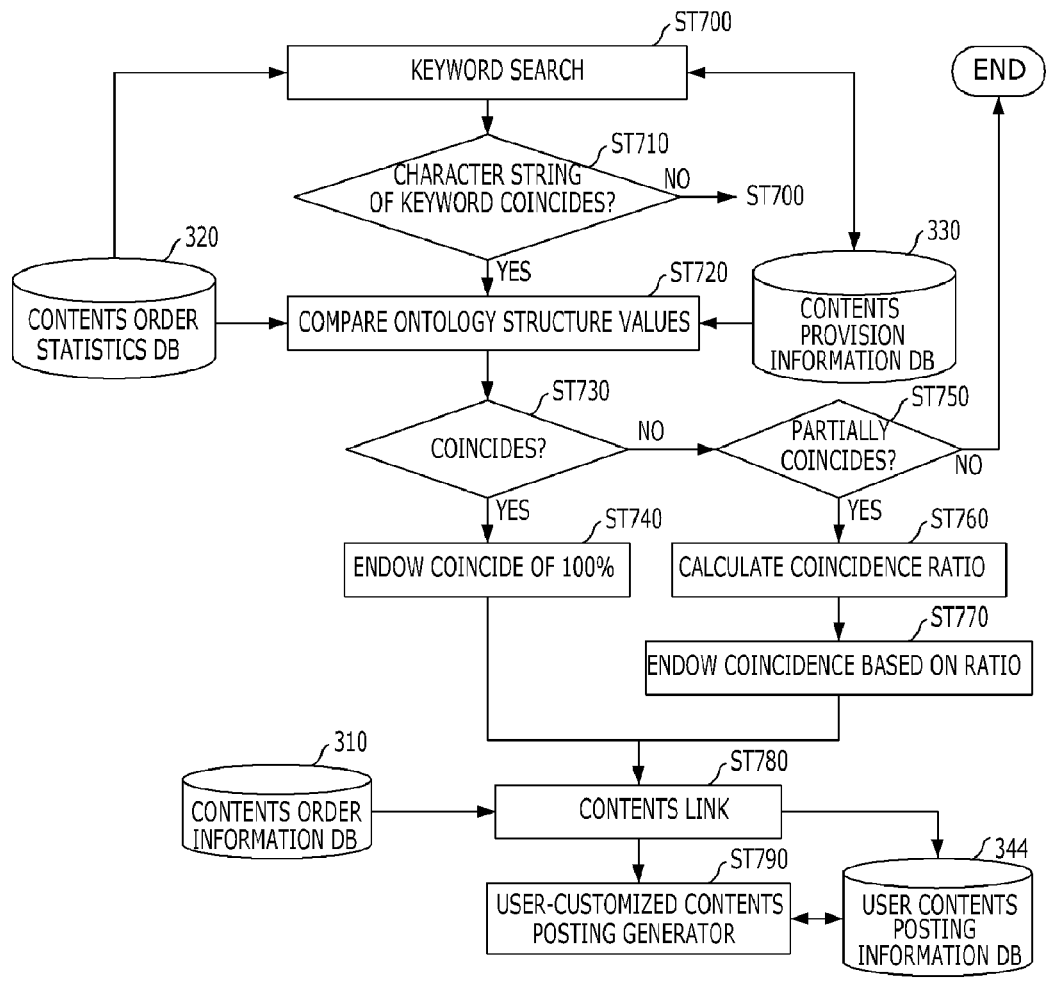
FIG. 21 shows a process of calculating a keyword coincidence during the contents filtering process.

FIG. 21 shows a process of calculating a keyword coincidence during the above-described contents filtering process. Referring to FIG. 21, keyword searching is performed on metadata elements of the contents provision information DB 330, using a metadata element name of the contents order statistics DB 320 as a keyword, at step ST700. Then, whether a character string of the keyword coincides or not is determined at step ST710. When the character string of the keyword coincides, ontology structure values of the two DBs 320 and 330 are compared at step ST720. Since the ontology structure values include numeral values, pattern matching is performed to compare the ontology structure values.

Subsequently, whether the ontology structure values completely coincide with each other is determined at step ST730. When the ontology structure values completely coincide with each other, it means that the metadata elements coincide with each other at 100%. Therefore, the coincidence of 100% is endowed at step ST740.

When the ontology structure values do not coincide with each other, whether the ontology structure values partially coincide with each other or not is determined at step ST750. When the ontology structure values partially coincide with each other, a coincidence ratio is calculated at step ST760, and a coincidence based on the coincidence ratio is endowed at step ST770.

For example, since a numerical value is designated for each metadata element as shown in the ontologies of FIGS. 4, 6, 8, and 10, pattern matching is performed to determine whether first numbers of the ontology structure values are identical to each other or not. When it is determined that the first numbers are equal to each other, pattern matching is further performed to determine whether the next numbers of the ontology structure values are equal to each other or not. When the ontology structure values including five-figure numbers have the same five-figure number, the two contents have a coincidence of 100%.

When the ontology structure values have different figures during the process of calculating the coincidence of the contents, the coincidence calculation is ended. For example, when the ontology structure value of the ordered contents is '123' and the ontology structure value of the provided contents is '124', the ontology structure values have one different figure. Therefore, the coincidence is calculated as follows: 100%−33.3%=66.7%.

The coincidence based on the ontology structure comparison between the ordered contents and the provided contents is used as the posting precedence of contents. For example, when contents have a coincidence of 100% in the four areas, the contents have the highest posting precedence. Therefore, since the posting precedence is decided according to the coincidence, the user may receive contents having a relatively high precision. Meanwhile, a contents provider may have an intention to more precisely provide contents to a user who requires contents of the contents provider. In this case, the contents provider may attempt to faithfully reflect contents into the metadata structures based on the above-described ontologies, which makes it possible to provide economic feasibility of contents distribution.

Then, the contents linker decides the posting precedence of the contents by referring to the contents order information DB 310 or the contents order statistics DB 320, at step ST780. When the posting precedence is decided, the user-customized contents posting generator 342 performs an operation.

Subsequently, a process of determining the form of contents, which are linked to contents position information or the like according to the posting precedence of the contents and are to be provided to the user terminal 100, is performed. Here, 'form' indicates a page form of the contents to be posted. For example, a method for arranging the contents on a homepage may be decided.

Figure 22:
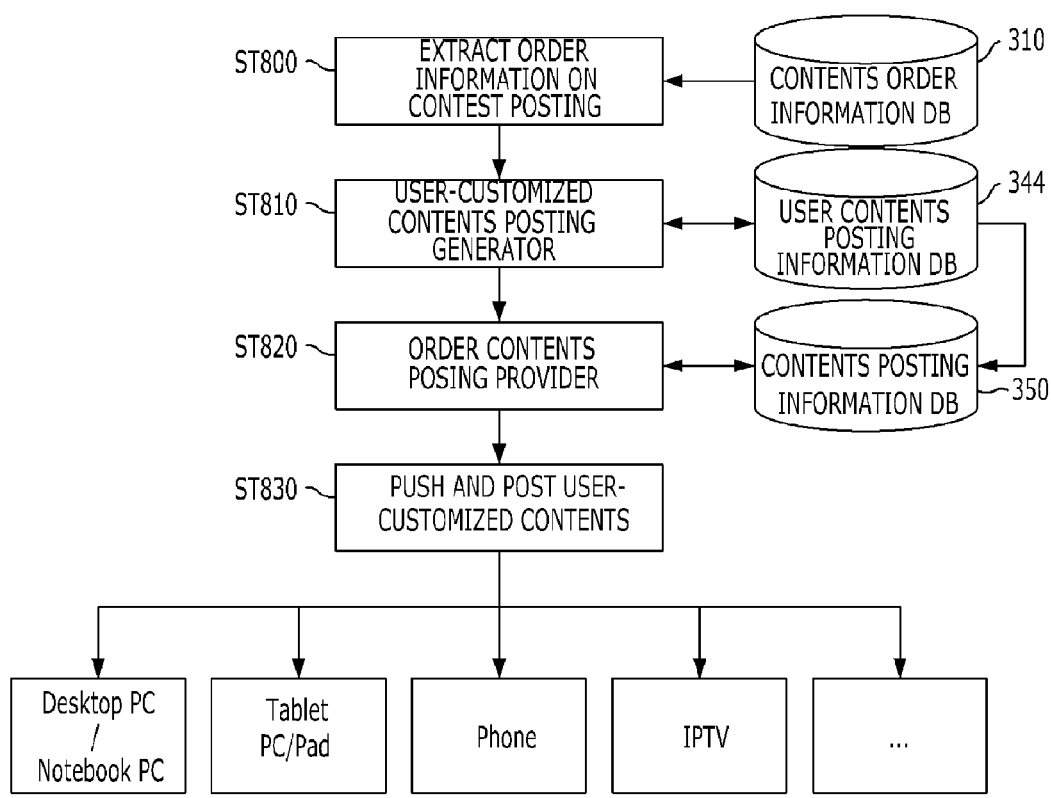
FIG. 22 shows a process of providing contents in a user-customized form.

FIG. 22 shows a process of providing the filtered contents in a user-customized form. When the contents filtering process is completed, a process of providing the filtered contents according to a posting method designated by the user is performed.

The user-customized contents posting provider 342 extracts order information on contents posting by referring to the contents order information DB 310 at step ST800. Furthermore, posting of the user-customized contents is generated and stored in the user contents posting information DB 344 at step ST810.

The user-customized contents posting provider 342 reads the user contents posting information DB 344 to update the contents posting information DB 350, and pushes and posts the user-customized contents at step ST830.

Figure 23:
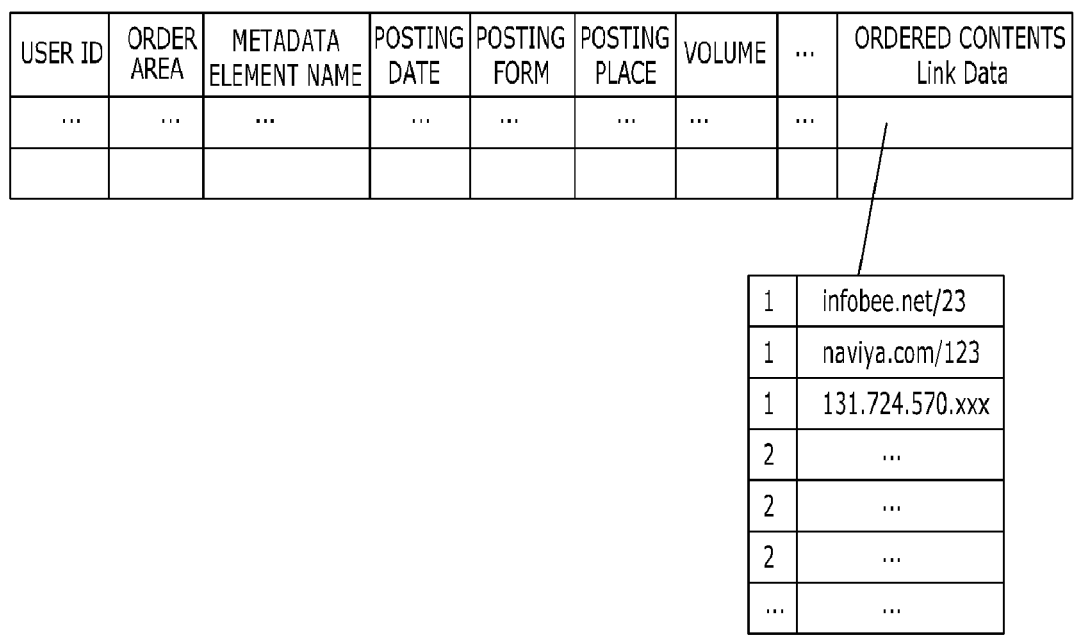
FIG. 23 shows a data table of a user contents posting information DB.

FIG. 23 shows a data model of the user contents posting information DB 344 in a table form. The user contents posting information DB 344 includes attribute information and list information of ordered contents which are linked during the filtering process. The attribute information includes a user ID, an order field, a metadata element name, a posting date, a posting form, a posting place, and a volume.

According to the attribute information of the user contents posting information DB 344, contents may be provided to a user through a designated terminal, by a designated volume, and at a designated time according to a designated posting form.

For example, referring to the attributes of FIG. 23, it can be seen that contents satisfying order conditions of a user may be provided. The order conditions include user-customized contents provided according to the contents ordered by the user, a posting place, a posting form, a posting date and so on.

All of the above-described DBs constructed in the embodiment of the present invention are implemented by an RDB or RDF model or a markup language such as XML or XHTML.

Figure 25:
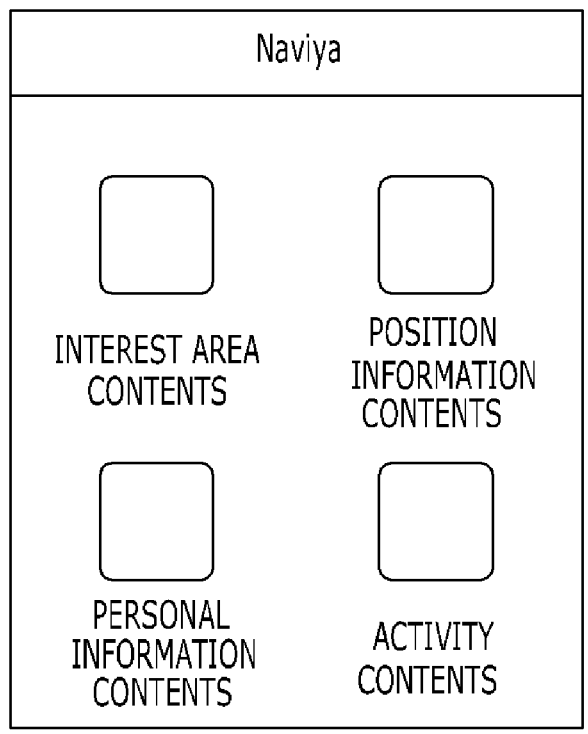
FIG. 25 shows an example in which a user receives a posting form on a smart phone.

FIG. 24 shows an example in which a user receives a posting form of contents ordered by the user on the desktop PC 100b. FIG. 25 shows an example in which a user receives a posting form on the smart phone 100a. The posting form on the desktop PC 100b is based on a homepage form of an information portal site, which is accustomed to PC users, and the posting form on the smart phone 100a is based on a form where a widget icon is set to an interface. Furthermore, a contents page according to the posting form designation is decided by selecting a posting template written by a predefined markup language such as HTML.

While the present invention has been described with respect to the specific embodiments, it will be apparent to those skilled in the art that various changes and modifications may be made without departing from the spirit and scope of the invention as defined in the following claims.

The invention claimed is:

1. A method for providing user-customized contents, comprising:

generating information required for ordering contents as metadata elements, providing the metadata elements to a user terminal in response to a request of a user, and preparing, by the user terminal, contents order information for the user by selecting metadata elements among the metadata elements provided to the user terminal by the user;

receiving the contents order information from the user terminal;

constructing a contents order information database (DB) for the user using the received contents order information;

receiving contents corresponding to the received contents order information from the contents provider;

constructing a contents provision information database (DB) based on the contents received from the contents provider; and filtering contents provided from the contents provider according to the contents order information stored in the contents order information database (DB) and providing matched contents to the user in a user-customized form, wherein the contents order information indicates contents information for obtaining contents desired by the user, wherein the user-customized form is generated by a contents posting method designated by the user, wherein the contents posting method comprises one or more metadata elements of a contents posting place, and a posting date, wherein the filtering of the provided contents comprises:
extracting an order information keyword of the user;
comparing the extracted keyword with a provision information keyword of the contents provider;
calculating a keyword coincidence; and
linking the provided contents according to the keyword coincidence, wherein the providing of the matched contents comprises:
extracting the contents posting method designated by the user from the contents order information DB;
constructing a user contents posting information DB to store contents posting information for the user; and
providing ordered contents to a user terminal by referring to the user contents posting information DB, and wherein the user contents posting information DB comprises one or more attributes of a user ID, an order field, a metadata element name, a posting date, a posting form, a posting place, and order contents link data.

2. The method according to claim 1, wherein the contents comprise any one of homepage contents of a web site, blog contents, SNS (social networking service) contents, advertisement contents, web service contents, music contents, video contents, still image contents, e-book contents, and text contents.

3. The method according to claim 1, wherein the contents order information DB stores metadata elements corresponding to the user's contents order information as attributes.

4. The method according to claim 3, wherein the metadata elements are generated by an ontology which is an order information expression frame.

5. The method according to claim 4, wherein the ontology has a tree structure, and a word is allocated to each node of the tree structure and has an ontology structure value.

6. The method according to claim 5, wherein the ontology structure value comprises a numerical value.

7. The method according to claim 5, wherein the ontology is provided for each of interest area information, position information, personal information, activity record information, and activity schedule information of the user.

8. The method according to claim 3, wherein the contents order information DB comprises one or more of:
    an interest area information DB configured to store the interest area information of the user;
    a position information DB configured to store the position information of the user;
    a personal information DB configured to store the personal information of the user; and
    an activity record/activity schedule information DB configured to store the activity record/activity schedule information of the user.

9. The method according to claim 8, wherein the interest area information DB has an attribute comprising one or more metadata elements of politics, society, economics, culture, science technology, entertainment, international affairs, education, health, childcare, weather, regions, jobs, labor, and welfare.

10. The method according to claim 8, wherein the position information DB has an attribute comprising metadata elements of current position information of the user.

11. The method according to claim 8, wherein the personal information DB has an attribute comprising one or more metadata elements of a name, family relations, a work place, a telephone number, an anniversary, a birthday, a hobby, and preference.

12. The method according to claim 8, wherein the activity record/schedule information DB has an attribute comprising one or more metadata elements of shopping records, travel records, and purchase information, which are related to the activity record information of the user, and one or more metadata elements of purchase schedule, travel schedule, marriage schedule, and event schedule, which are related to the activity schedule information of the user.

13. The method according to claim 8, wherein the contents order information DB further comprises information on a plurality of contents posting methods, each for one of the interest area information DB, the position information DB, the personal information DB, and the activity record/activity schedule DB.

14. The method according to claim 13, wherein each of the plurality of contents posting methods comprises one or more metadata elements of a contents size, a posting form, and a production date.

15. The method according to claim 1, wherein the constructing of the contents order information DB comprises:
    storing the received metadata elements as attributes of the contents order information DB.

16. The method according to claim 5, wherein the constructing of the contents order information DB comprises:
    extracting an ontology structure value coinciding with a metadata element name of the inputted contents order information; and
    implementing the contents order information DB using the metadata element name and the ontology structure value as its attributes.

17. The method according to claim 1, wherein the contents order information DB is implemented by a DB using one or more markup languages among an RDB (relation data base) model, XML, XHTML, and HTML.

18. The method according to claim 1, wherein the contents provision information DB stores metadata elements corresponding to the contents order information of the user as attributes.

19. The method according to claim 18, wherein the metadata elements are generated by an ontology which is a provision information expression frame.

20. The method according to claim 19, wherein the ontology has a tree structure, and a word is allocated to each node of the tree structure and has an ontology structure value.

21. The method according to claim 20, wherein the ontology structure value comprises a numerical value.

22. The method according to claim 20, wherein the ontology is provided for each of interest area information, position information, personal information, activity record information, and activity schedule information of the user.

23. The method according to claim 20, wherein the constructing of the contents provision information DB comprises:
    inputting a metadata element name for the contents provided by the contents provider;
    retrieving the ontology using the inputted metadata element name;
    extracting an ontology structure value; and
    implementing the contents provision information DB using the inputted metadata element name and the ontology structure value as its attributes.

24. The method according to claim 20, wherein the constructing of the contents provision information DB comprises:
    operating a text crawler to scan texts within the contents;
    extracting a keyword from the texts;
    retrieving the ontology of the contents order information using the keyword;
    extracting an ontology structure value; and
    implementing the contents provision information DB using the keyword and the ontology structure value as its attributes.

25. The method according to claim 20, wherein the constructing of the contents provision information DB comprises:
    operating a text crawler to scan texts within the contents;
    generating a keyword by morpheme-processing the texts;
    retrieving the ontology of the contents order information using the keyword;
    extracting an ontology structure value; and implementing the contents provision information DB using the keyword and the ontology structure value as its attributes.

26. The method according to claim 1, wherein the constructing of the contents provision information DB comprises:
confirming whether the contents provider is an effective contents provider or not;
selecting an area of contents to be provided;
creating metadata elements for the contents to be provided; and
implementing the contents provision information DB using the metadata elements for the contents to be provided.

27. The method according to claim 1, wherein the contents provision information DB has a data attribute comprising one or more of a keyword, a contents name, a producer, a production date, a provision site, a place, content, a character, and an ontology structure value.

28. The method according to claim 1, wherein the contents provision information DB is implemented by a DB using one or more markup languages of an RDB model XML, XHTML, and HTML.

29. The method according to claim 1, further comprising constructing a contents posting information DB by storing contents posting information according to the keyword coincidence.

30. The method according to claim 1, further comprising waiting for posting of contents according to the contents posting method designated by the user.

31. The method according to claim 30, further comprising constructing a user contents posting information DB configured to store contents posting information for each user according to the contents posting method designated by the user.

32. The method according to claim 1, wherein the calculating of the keyword coincidence comprises:
comparing character strings of the keyword extracted from the order information of the user and the keyword provided from the contents provider;
comparing ontology structure values of the two keywords when the character strings coincide with each other; and
calculating a coincidence according to the comparison result of the ontology structure values.

33. The method according to claim 32, wherein the coincidence is expressed as percentage.

34. The method according to claim 1, wherein the user contents posting information DB is implemented by a DB using one or more markup languages of an RDB model, XML, XHTML, and HTML.

35. A system for providing user-customized contents, comprising:
a user terminal;
a user-customized contents providing server connected to the user terminal through a wired or wireless network;
a user contents order metadata generator configured to generate information required for ordering contents as metadata elements and to provide the metadata elements to the user terminal in response to a request of a user, wherein the user terminal is further configured to prepare contents order information of the user based on metadata elements selected by the user, among the metadata elements provided to the user terminal;
a contents order information database (DB) configured to store the contents order information of the user;
a contents order information DB generator configured to generate the contents order information DB using the contents order information of the user;
a contents provision information database (DB) configured to store contents provision information of the contents provider;
a contents filtering processor configured to filter contents provided from the contents provider according to the contents order information stored in the contents order information DB to provide matched contents in a user-customized form,
a contents posting information DB configured to store contents posting information according to the keyword coincidence, and
a user contents posting information DB configured to store contents posting information for each user according to the contents posting method designated by the user,
wherein the contents order information indicates contents information for obtaining contents desired by the user,
wherein the user-customized form is generated by a contents posting method designated by the user,
wherein the contents posting method comprises one or more metadata elements of a contents posting place, and a posting date,
wherein the contents filtering processor calculates a coincidence between an order information keyword of the user and a provision information keyword of the contents provider, filters the contents based on the coincidence, compares character strings of the keyword extracted from the order information of the user and the keyword provided from the contents provider, and
wherein the user contents posting information DB comprises one or more attributes of a user ID, an order field, a metadata element name, a posting date, a posting form, a posting place, and order contents link data.

36. The system according to claim 35, wherein the contents comprise any one of homepage contents of a web site, blog contents, SNS contents, advertisement contents, web service contents, music contents, video contents, still image contents, e-book contents, and text contents.

37. The system according to claim 35, wherein the metadata elements are generated by an ontology which is an order information expression frame.

38. The system according to claim 37, wherein the ontology has a tree structure, and a word is allocated to each node of the tree structure and has an ontology structure value.

39. The system according to claim 38, wherein the ontology structure value comprises a numeral value.

40. The system according to claim 38, wherein the ontology is provided for each of interest area information, position information, personal information, activity record information, and activity schedule information of the user.

41. The system according to claim 38, wherein the contents order information DB stores the contents order information using a metadata element name of the contents order information inputted by the user and an ontology structure value coinciding with the metadata element name as attributes of the contents order information DB.

42. The system according to claim 35, wherein the contents order information DB comprises one or more of:
an interest area information DB configured to store interest area information of the user;
a position information DB configured to store position information of the user;
a personal information DB configured to store personal information of the user; and an activity record/activity schedule information DB configured to store activity record/activity schedule information of the user.

43. The system according to claim 42, wherein the interest area information DB has an attribute comprising one or more metadata elements of politics, society, economics, culture, science technology, entertainment, international affairs, education, health, childcare, weather, regions, jobs, labor, and welfare.

44. The system according to claim 42, wherein the position information DB has an attribute comprising metadata elements of current position information of the user.

45. The system according to claim 42, wherein the personal information DB has an attribute comprising one or more metadata elements of a name, family relations, a work place, a telephone number, an anniversary, a birthday, a hobby, and preference.

46. The system according to claim 42, wherein the activity record/schedule information DB has an attribute comprising one or more metadata elements of shopping records, travel records, and purchase information, which are related to the activity record information, and one or more metadata elements of purchase schedule, travel schedule, marriage schedule, and event schedule, which are related to the activity schedule information of the user.

47. The system according to claim 42, wherein the contents order information DB stores information on a plurality of contents posting methods, each for one of the interest area information DB, the position information DB, the personal information DB, and the activity record/activity schedule.

48. The system according to claim 47, wherein each of the plurality of contents posting methods comprises one or more metadata elements of a contents size, a posting form, and a production date.

49. The system according to claim 35, wherein the contents order information DB provides metadata elements related to the contents order information to the user terminal, and stores the contents order information using a metadata element selected or written by the user as an attribute.

50. The system according to claim 35, wherein the contents order information DB is implemented by a DB using any one markup languages of an RDB model, XML, XHTML, and HTML.

51. The system according to claim 35, further comprising:
a contents provision metadata generator configured to generate metadata for the contents provision information of the contents provider; and
a contents provision information DB generator configured to generate the contents provision information DB using metadata elements corresponding to the contents provision information of the contents provider as attributes.

52. The system according to claim 51, wherein the contents provision information DB stores the contents provision information using the metadata elements corresponding to the order information of the user as the attributes.

53. The system according to claim 52, wherein the metadata elements are generated by an ontology which is a provision information expression frame.

54. The system according to claim 53, wherein the ontology has a tree structure, and a word is allocated to each node of the tree structure and has an ontology structure value.

55. The system according to claim 54, wherein the ontology structure value comprises a numeral value.

56. The system according to claim 54, wherein the ontology is provided for each of interest area information, position information, personal information, activity record information, and activity schedule information of the user.

57. The system according to claim 35, further comprising a text crawler configured to scan texts from the contents provided by the contents provider.

58. The system according to claim 57, further comprising a morpheme processor configured to morpheme-process the texts scanned by the text crawler and extract a keyword.

59. The system according to claim 35, wherein the contents provision information DB has a data attribute comprising one or more of a keyword, a contents name, a producer, a production date, a provision site, a place, content, a character, and an ontology structure value.

60. The system according to claim 35, wherein the contents provision information DB is implemented by a DB using one or more markup languages of an RDB mode, XML, XHTML, and HTML.

61. The system according to claim 35, wherein the coincidence is expressed as percentage.

62. The system according to claim 35, wherein the user contents posting information DB is implemented by a DB using one or more markup languages of an RDB model, XML, XHTML, and HTML.

* * * * *